United States Patent
Matsuo et al.

(10) Patent No.: US 10,159,042 B2
(45) Date of Patent: Dec. 18, 2018

(54) WIRELESS COMMUNICATION DEVICE AND WIRELESS COMMUNICATION METHOD

(71) Applicant: Kabushiki Kaisha Toshiba, Minato-ku (JP)

(72) Inventors: Ryoko Matsuo, Shinagawa (JP);
Toshiyuki Nakanishi, Yokohama (JP);
Toshihisa Nabetani, Kawasaki (JP);
Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 51 days.

(21) Appl. No.: 15/391,300

(22) Filed: Dec. 27, 2016

(65) Prior Publication Data

US 2017/0111890 A1 Apr. 20, 2017

Related U.S. Application Data

(63) Continuation of application No. PCT/JP2015/076581, filed on Sep. 17, 2015.

(30) Foreign Application Priority Data

Sep. 19, 2014 (JP) .................................. 2014-191822

(51) Int. Cl.
*H04J 1/16* (2006.01)
*H04L 12/721* (2013.01)
(Continued)

(52) U.S. Cl.
CPC ....... *H04W 52/0216* (2013.01); *H04L 5/0048* (2013.01); *H04W 72/042* (2013.01);
(Continued)

(58) Field of Classification Search
CPC ............. H04W 72/0446; H04W 74/04; H04W 36/06; H04L 5/0048
(Continued)

(56) References Cited

U.S. PATENT DOCUMENTS 8,913,628 B2 12/2014 Patel et al.
2007/0184831 A1* 8/2007 Morimoto ............. H04W 48/20
455/432.1
(Continued)

FOREIGN PATENT DOCUMENTS

JP 2010-245975 A 10/2010
JP 2011-530932 A 12/2011
(Continued)

OTHER PUBLICATIONS

U.S. Appl. No. 15/057,446, filed Mar. 1, 2016, Ryoko Matsuo et al.
(Continued)

*Primary Examiner* — Asad M Nawaz
*Assistant Examiner* — Jason A Harley
(74) *Attorney, Agent, or Firm* — Oblon, McClelland, Maier & Neustadt, L.L.P.

(57) ABSTRACT

A wireless communication device includes: controlling circuitry configured to selectively switch an operating channel between a first channel and a second channel; and a transmitter configured to transmit a first beacon signal through the first channel at a first cycle and transmit a second beacon signal through the second channel at a second cycle. A first period during which transmission/reception of a signal is possible and a second period during which transmission/reception of a signal is not performed are set for the second channel within a transmission interval of second beacon signals. The controlling circuitry switches the operating channel from the second channel to the first channel during the second period. The transmitter transmits the first beacon
(Continued)

signal through the first channel during the second period. The controlling circuitry switches the operating channel from the first channel to the second channel by an end of the second period.

16 Claims, 21 Drawing Sheets

(51) Int. Cl.
*H04W 36/00* (2009.01)
*H04L 12/28* (2006.01)
*H04W 52/02* (2009.01)
*H04L 5/00* (2006.01)
*H04W 72/04* (2009.01)
*H04W 84/18* (2009.01)

(52) U.S. Cl.
CPC ........ *H04W 72/0446* (2013.01); *H04W 84/18* (2013.01); *Y02D 70/00* (2018.01); *Y02D 70/142* (2018.01); *Y02D 70/144* (2018.01); *Y02D 70/168* (2018.01); *Y02D 70/26* (2018.01)

(58) Field of Classification Search
USPC .................................................. 370/433, 458
See application file for complete search history.

(56) References Cited

U.S. PATENT DOCUMENTS

| | | | |
|---|---|---|---|
| 2010/0260158 A1 | 10/2010 | Naito et al. | |
| 2011/0002252 A1* | 1/2011 | Kim ................. | H04W 52/0216 370/311 |
| 2011/0044302 A1* | 2/2011 | Toshimitsu ........... | H04W 72/02 370/338 |
| 2012/0307702 A1 | 12/2012 | Nakae et al. | |
| 2013/0322348 A1* | 12/2013 | Julian .................... | H04L 5/003 370/329 |
| 2015/0238082 A1* | 8/2015 | Soro .................... | A61B 5/0024 600/300 |

FOREIGN PATENT DOCUMENTS

| | | |
|---|---|---|
| JP | 5272005 | 8/2013 |
| JP | 2014-72725 | 4/2014 |
| WO | WO 2012/086151 A1 | 6/2012 |
| WO | WO 2014/050041 A1 | 4/2014 |

OTHER PUBLICATIONS

U.S. Appl. No. 15/176,664, filed Jun. 8, 2016, Ryoko Matsuo et al.
U.S. Appl. No. 15/265,156, filed Sep. 14, 2016, Ryoko Matsuo et al.
International Search Report dated Dec. 15, 2015 in PCT/JP2015/076581, filed on Sep. 17, 2015.

* cited by examiner

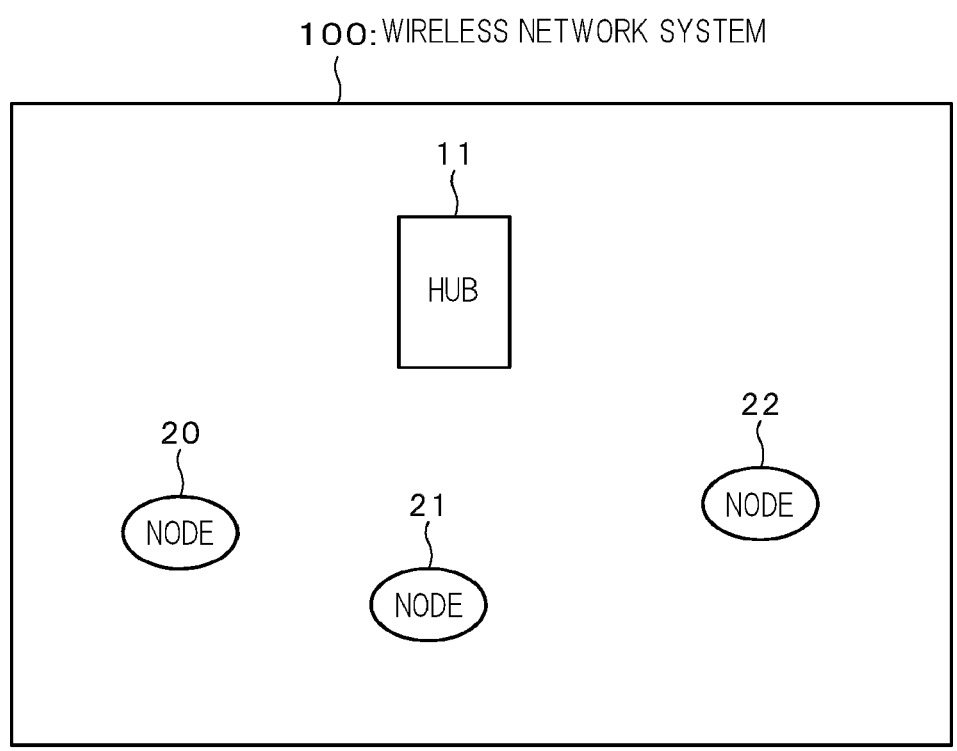
F I G. 1

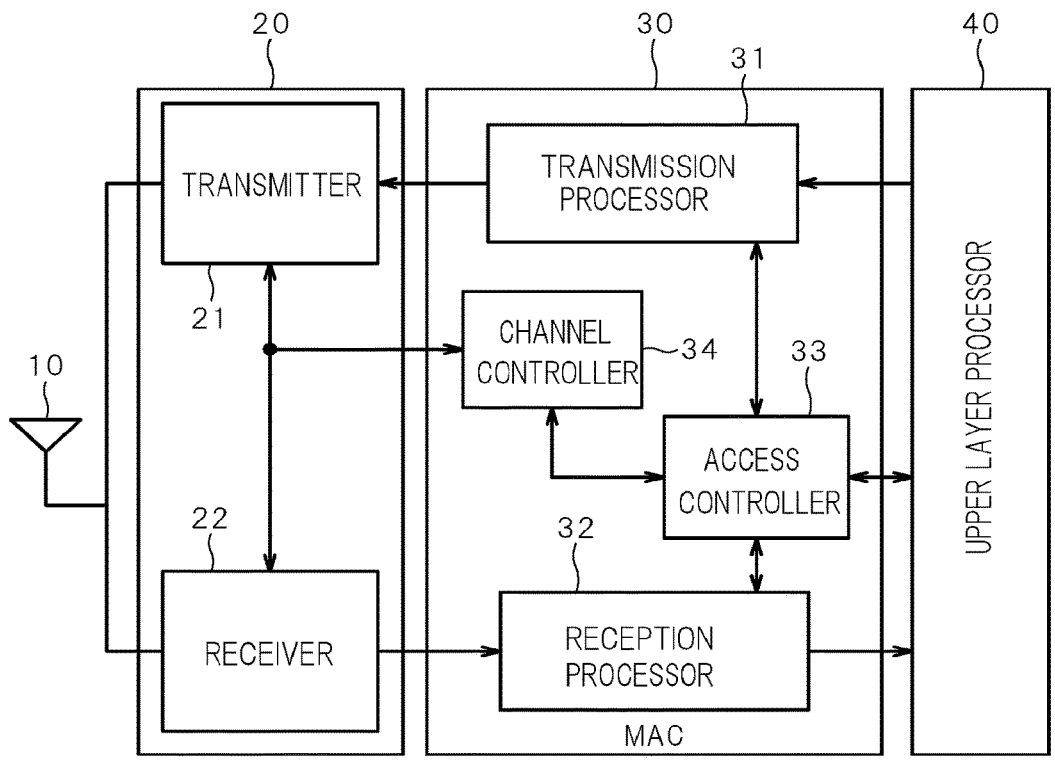
F I G. 3
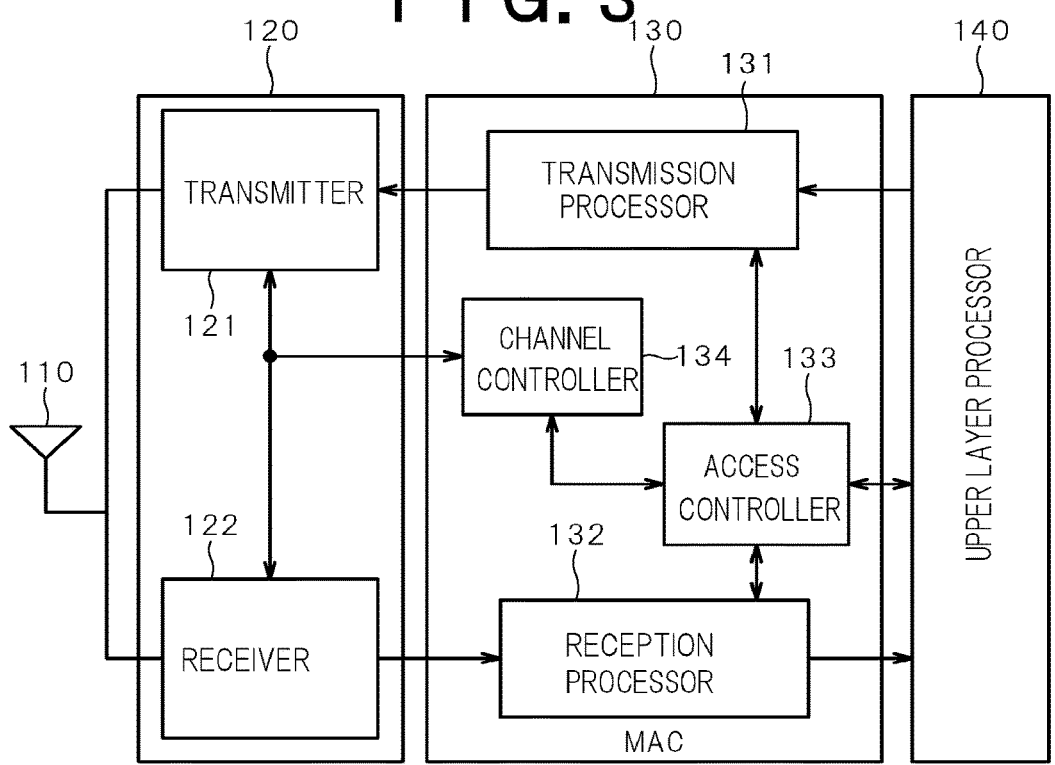
F I G. 4

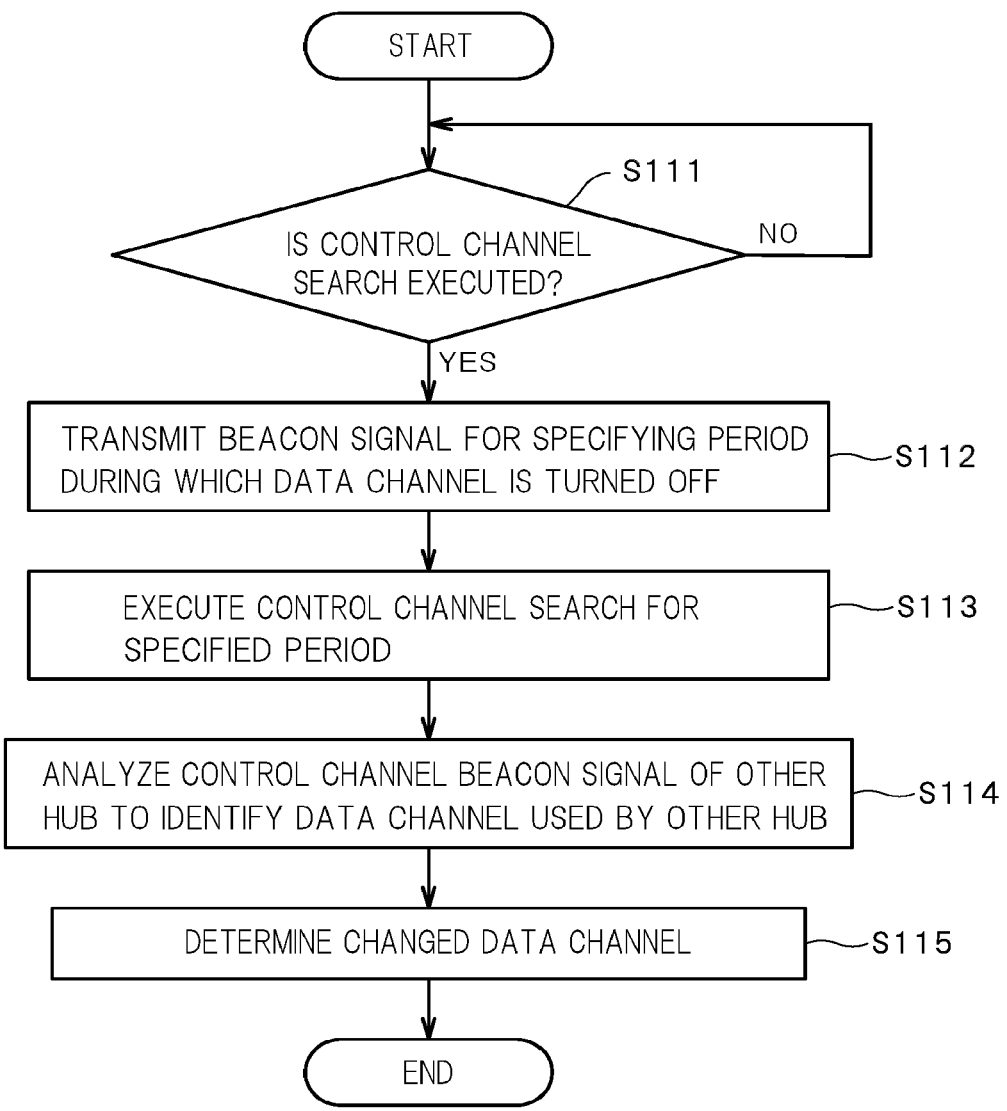
F I G. 6

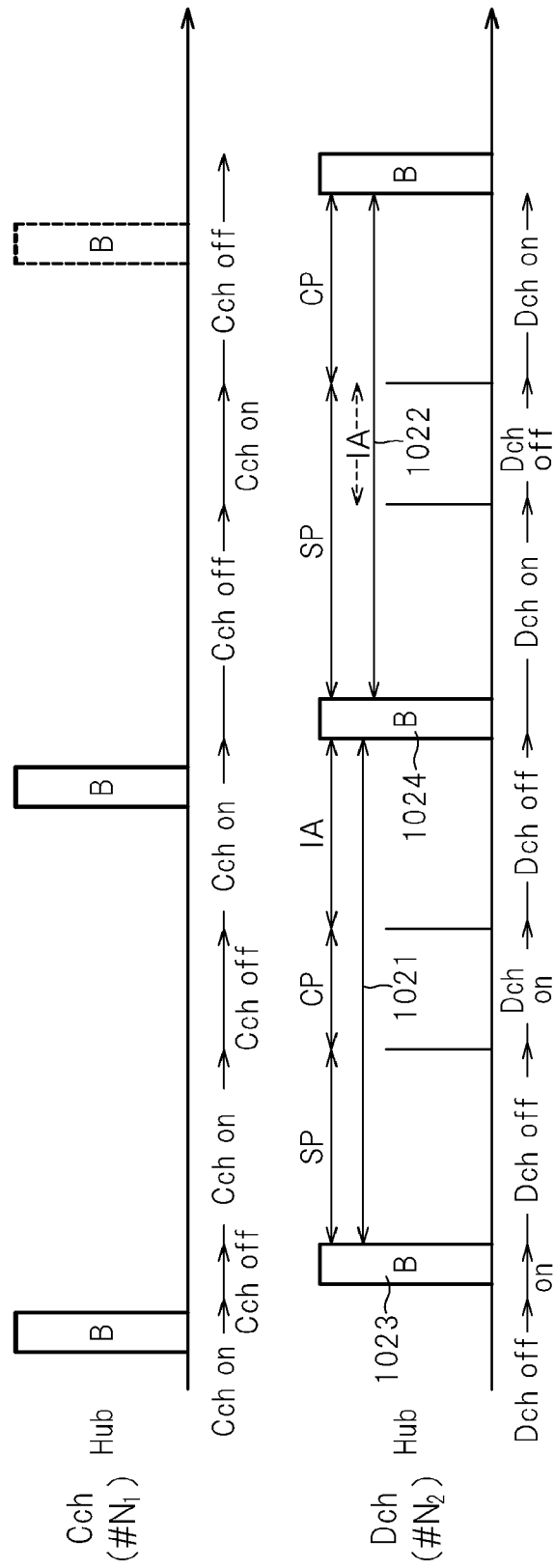
F I G. 7

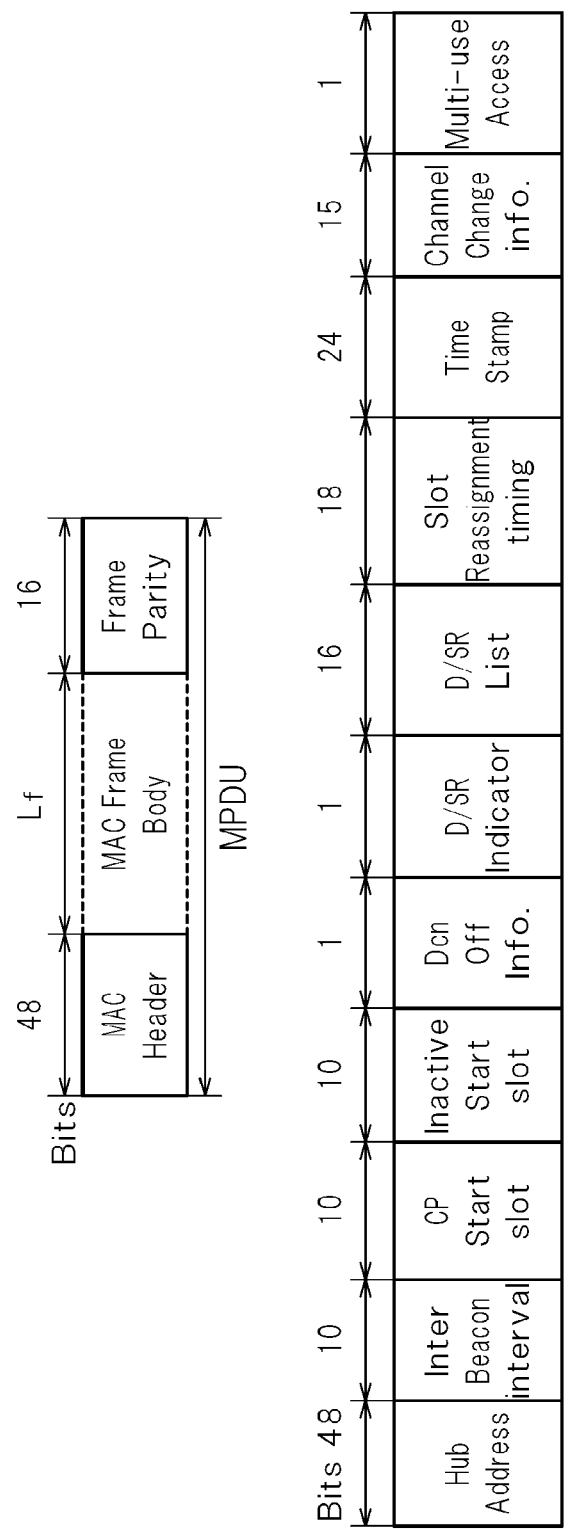
F I G. 8

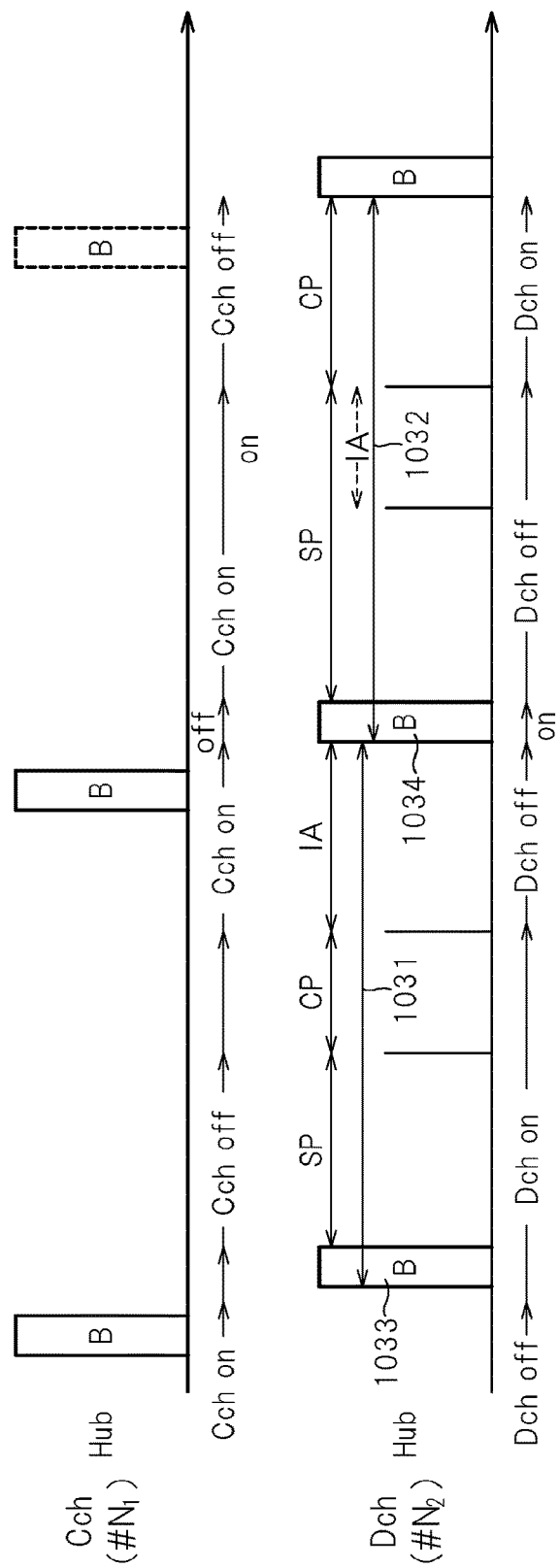
F I G. 10

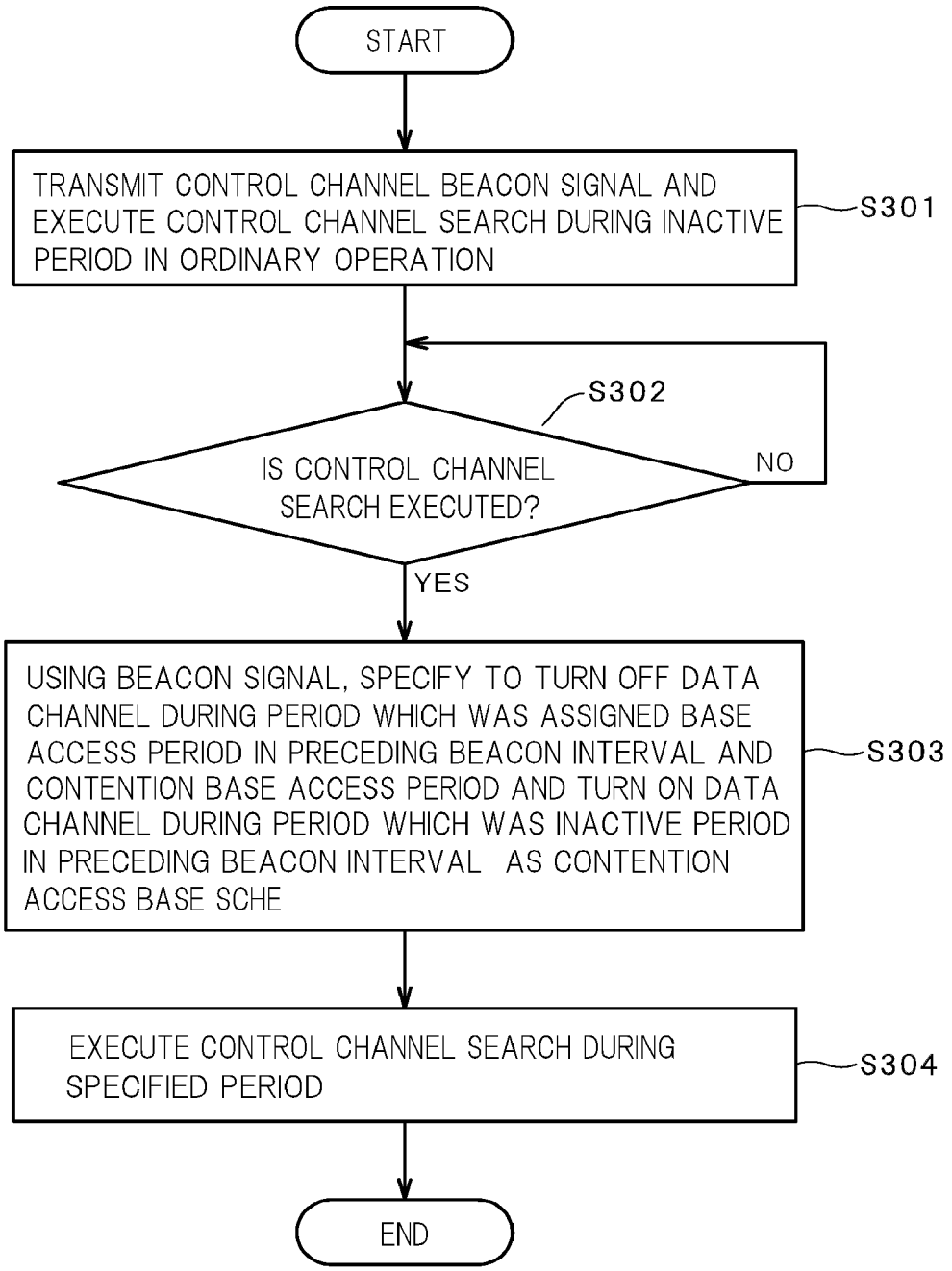
F I G. 11

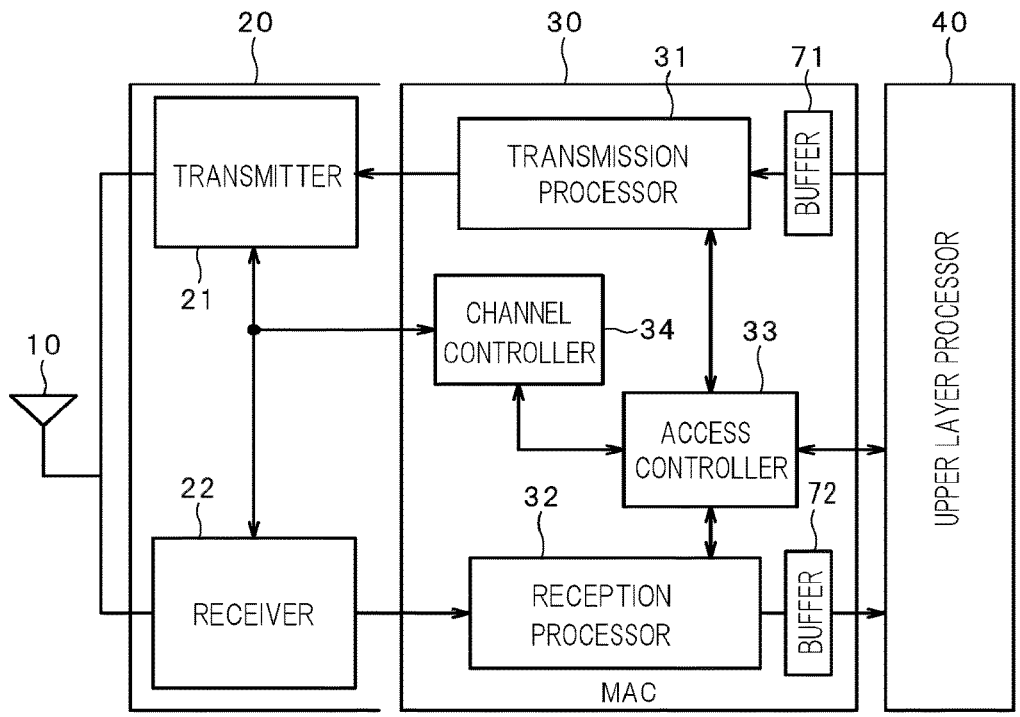
F I G. 12
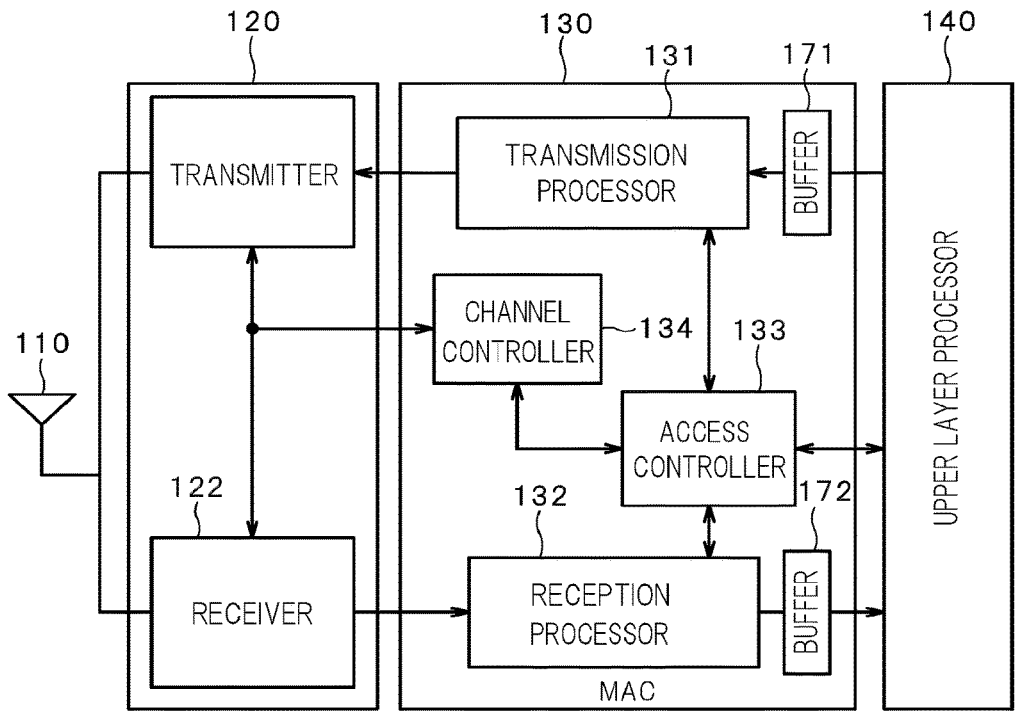
F I G. 13

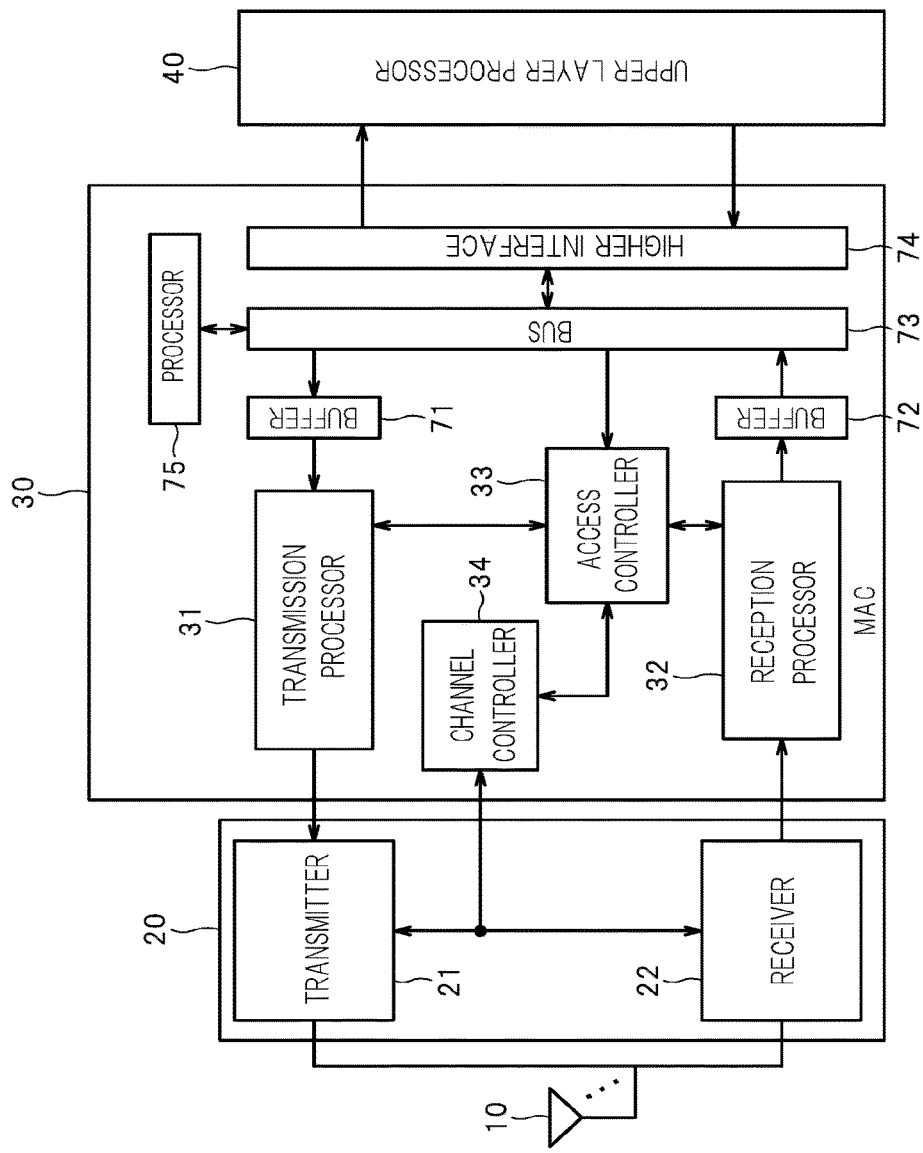
F I G. 14

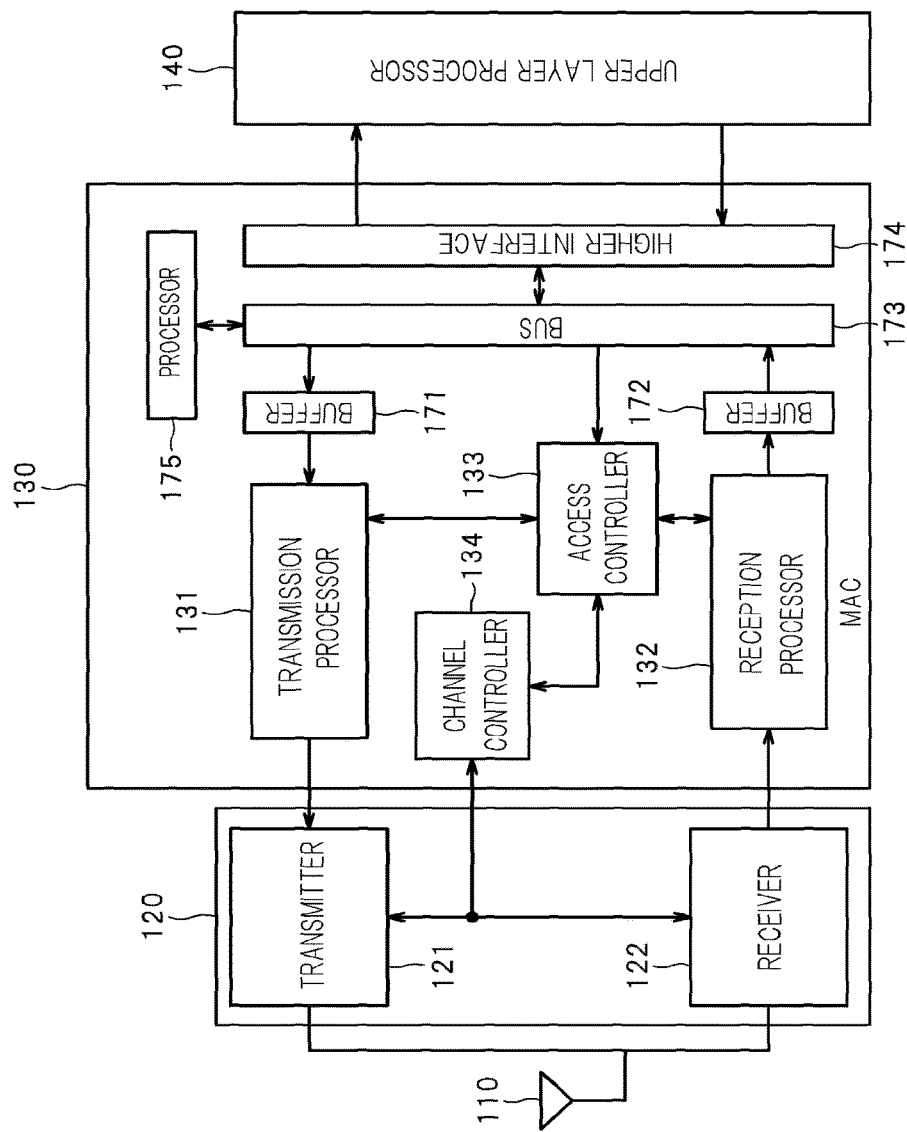
F I G. 15

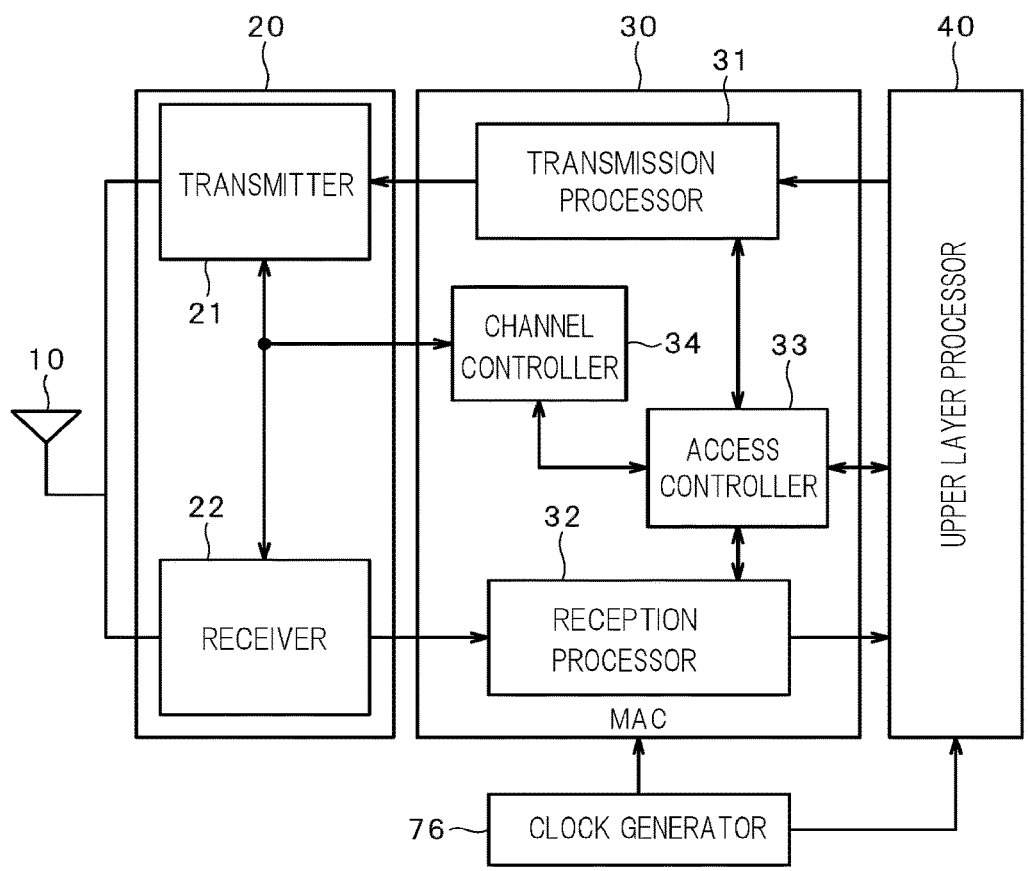
F I G. 16

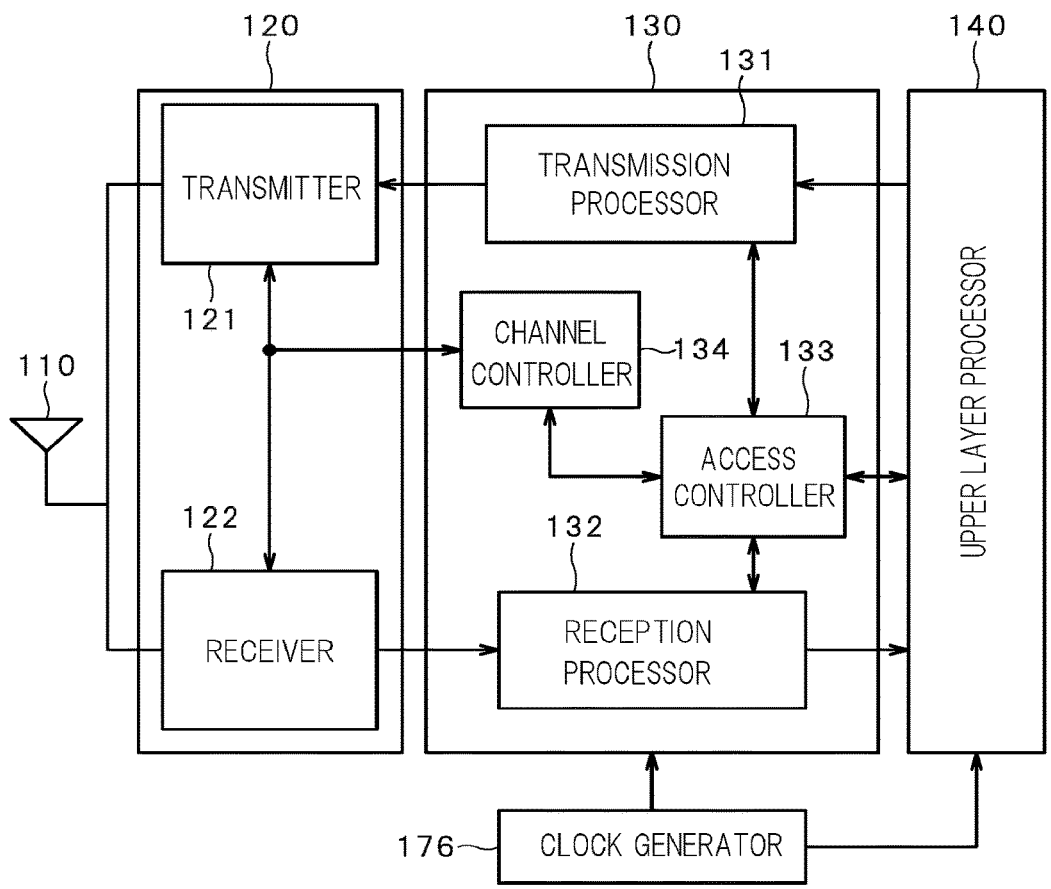
F I G. 17
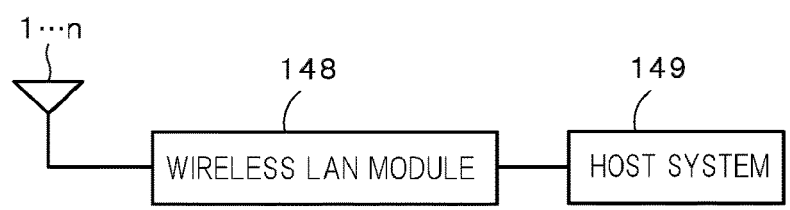
F I G. 18A

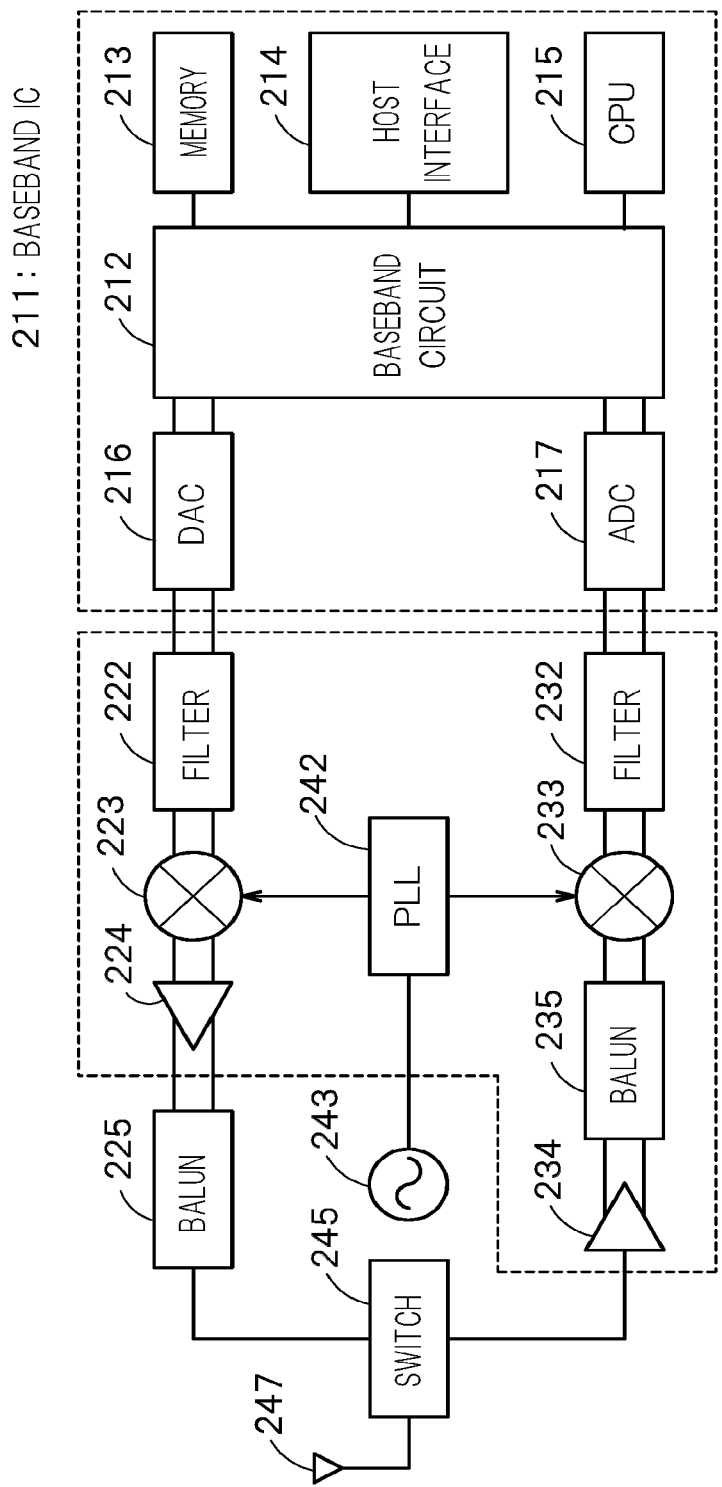
F I G. 18B

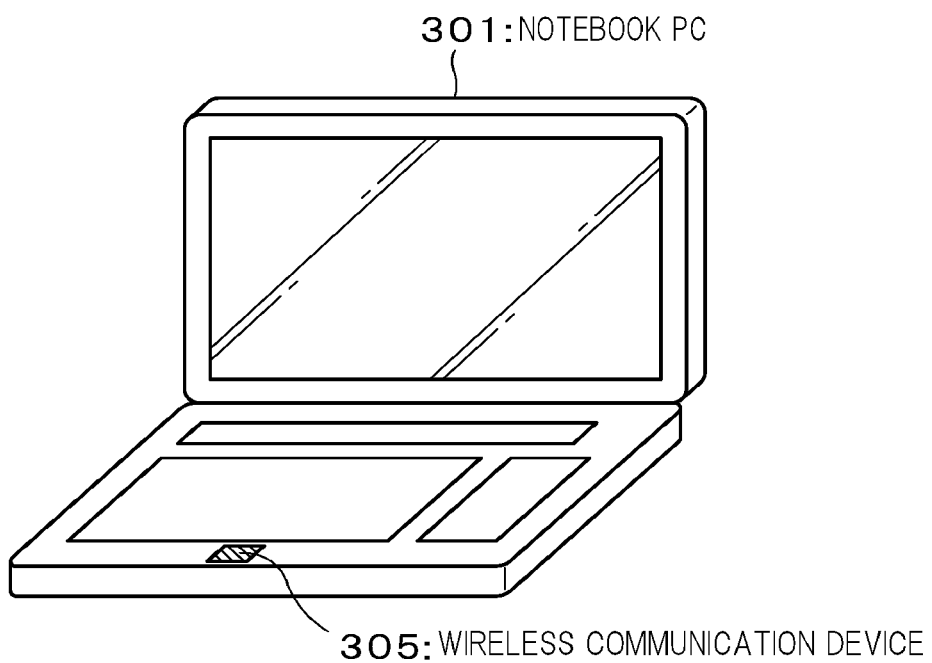
F I G. 19A
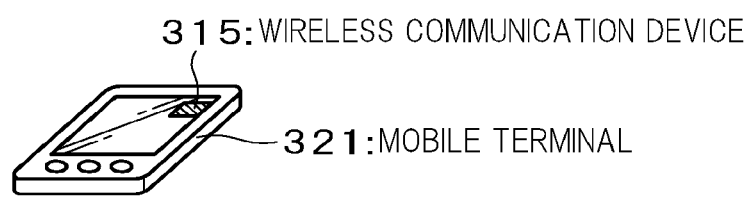
F I G. 19B

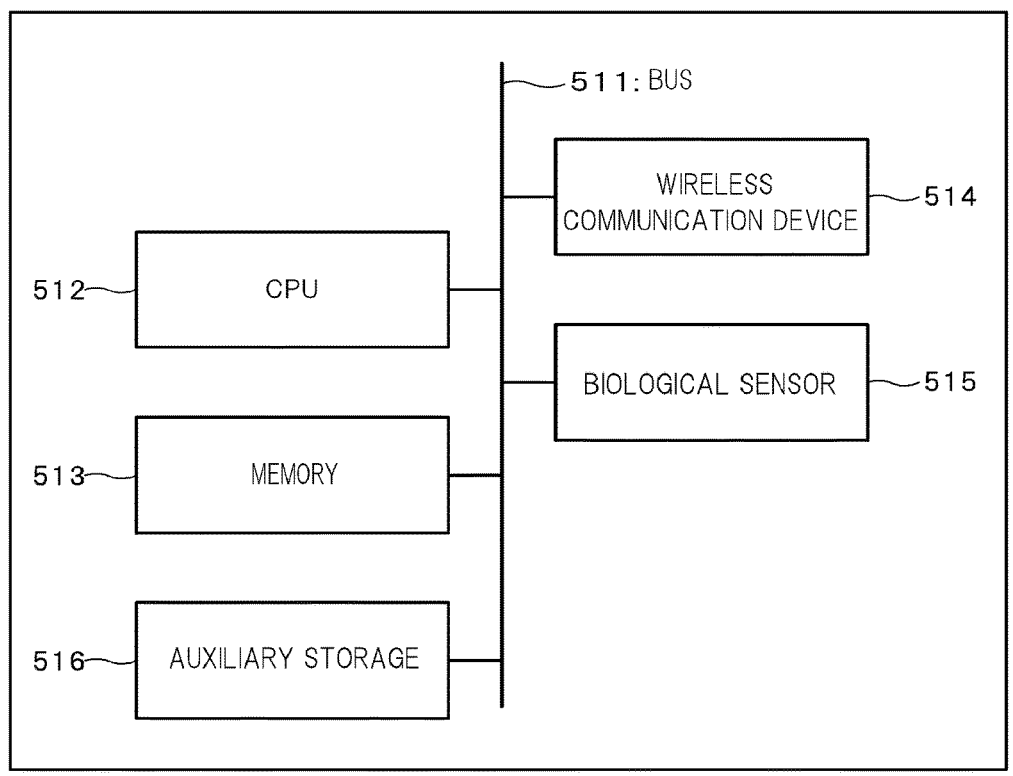
F I G. 22

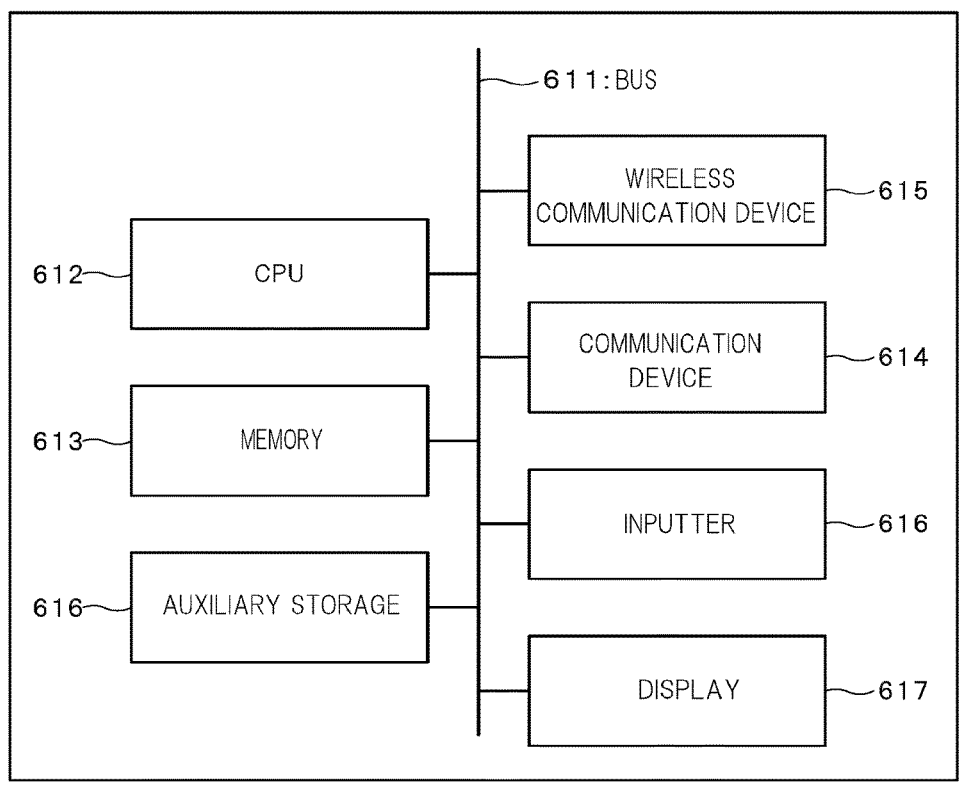
F I G. 23

WIRELESS COMMUNICATION DEVICE AND WIRELESS COMMUNICATION METHOD

CROSS REFERENCE TO RELATED APPLICATIONS

This application is a Continuation of International Application No. PCT/JP2015/076581, filed on Sep. 17, 2015, the entire contents of which is hereby incorporated by reference.

FIELD

Embodiments of the present invention relate to a wireless communication device and a wireless communication method.

BACKGROUND

A network called a "body area network" is known as a wireless network formed around a human body. In the body area network, a hub as a central device and nodes as terminal devices are attached to the human body and communication is performed between the hub and nodes.

IEEE802.15.6 discloses an access scheme using one channel as an example of a communication method between the hub and nodes in the body area network. On the other hand, unlike such a scheme, a mechanism is also under study in which the hub uses a control channel and a data channel. More specifically, a method is under study whereby when it is desirable to change a data channel to another data channel for a reason that the data channel is affected by interference or the like, the node temporarily returns to the control channel to identify the changed data channel using a beacon signal of the control channel. According to this method, when the data channel is changed, the node need not perform a channel search on all data channel candidates and can thereby possibly reduce power consumption. The hub receives a beacon signal of the control channel from another hub, and can thereby acquire information on the data channel or the like used in the other hub. In this case, to prevent power consumption from increasing due to an increase of channel search, it is preferable to set a smaller number of candidates for the control channel than for the data channel.

On the other hand, as another technique, when a channel currently in use is changed to another channel, a mechanism of searching channels different from the operating channel is being reviewed. For example, a mechanism is being proposed as application for sensor communication in which while being connected to a terminal device, for such a short period of time that a retransmitted signal from the terminal device can be received, reception processing of a channel in use is suspended and a search is performed to determine whether another cannel is busy or not.

However, according to the technique, since the channel suspension period is short, it is all right when handling an emergency signal which becomes a problem in the body area network, but the technique spends a short time searching for other channels. If this prior art is applied to a body area network, the problem is that the search time is too short for the hub to switch the data channel to the control channel, receive a beacon signal of the other hub and obtain information on the data channel.

BRIEF DESCRIPTION OF THE DRAWINGS

FIG. 1 is a diagram illustrating an example of a wireless network system according to Embodiment 1;

FIG. 3 is a block diagram of a wireless communication device provided for the hub;

FIG. 4 is a block diagram of a wireless communication device provided for a node;

FIG. 6 is a flowchart in a second operation example of the hub;

FIG. 7 is a timing chart of a hub according to Embodiment 2;

FIG. 8 is a diagram illustrating a format example of a data channel beacon signal;

FIG. 10 is a timing chart of a hub according to Embodiment 3;

FIG. 11 is a flowchart in an operation example of the hub;

FIG. 12 is a block diagram of a wireless communication device provided for a hub according to Embodiment 4;

FIG. 13 is a block diagram of a wireless communication device provided for a node according to Embodiment 4;

FIG. 14 is a block diagram of a wireless communication device provided for a hub according to Embodiment 5;

FIG. 15 is a block diagram of a wireless communication device provided for a node according to Embodiment 5;

FIG. 16 is a block diagram of a wireless communication device provided for a hub according to Embodiment 6;

FIG. 17 is a block diagram of a wireless communication device provided for a node according to Embodiment 6;

FIG. 18A is a diagram illustrating an overall configuration example of a node or hub according to Embodiment 7;

FIG. 18B is a diagram illustrating a hardware configuration example of a wireless communication device mounted on the hub or node according to Embodiment 7;

FIGS. 19A and 19B each is a perspective view of a wireless communication terminal according to Embodiment 8;

FIG. 22 is a hardware block diagram of a node according to Embodiment 17; and FIG. 23 is a hardware block diagram of the hub according to Embodiment 17.

DETAILED DESCRIPTION

Figure 2:
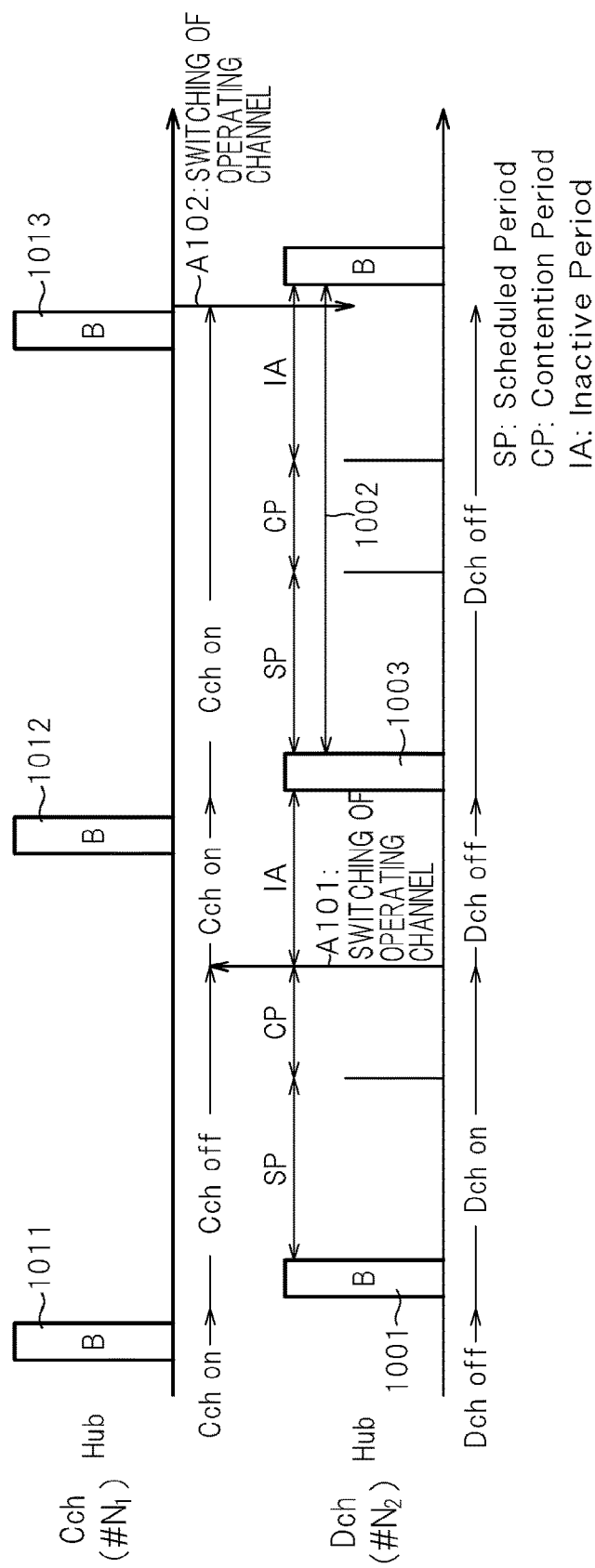
FIG. 2 is a timing chart of a hub.

According to one embodiment, a wireless communication device includes: controlling circuitry configured to selectively switch an operating channel between a first channel and a second channel; and a transmitter configured to transmit a first beacon signal through the first channel at a first cycle and transmit a second beacon signal through the second channel at a second cycle. A first period during which transmission/reception of a signal is possible and a second period during which transmission/reception of a signal is not performed are set for the second channel within a transmission interval of second beacon signals. The controlling circuitry is configured to switch the operating channel from the second channel to the first channel during the second period. The transmitter is configured to transmit the first beacon signal through the first channel during the second period, and the controlling circuitry is configured to switch the operating channel from the first channel to the second channel by an end of the second period.

Hereinafter, embodiments of the present invention will be described in detail with reference to the accompanying drawings.

Embodiment 1

FIG. 1 illustrates an example of a wireless network system according to Embodiment 1. A wireless network system 100 shown in FIG. 1 includes a hub 11 and a plurality of nodes 20, 21 and 22. The hub 11 is a base station including a wireless communication device operating as a center device. Each node is a terminal including a wireless communication device that communicates with the center device. The base station can also be considered as one form of a terminal. The wireless communication device of the hub 11 is a target communication device for the nodes 20, 21 and 22 and the wireless communication devices of the nodes 20, 21 and 22 are target communication devices for the hub 11.

Each node incorporates, for example, one or a plurality of sensors and wirelessly transmits sensing information acquired through the sensors to the hub 11. Each node wirelessly receives control information or the like necessary for communication from the hub. In the case of a body area network, each node and the hub are attached to a human body. Attachment to the human body may include all forms of cases where the hub and nodes are located in proximity to the human body: the hub and nodes may be directly in contact with the human body; attached over clothing; fixed to a cord hanging from the neck; put in a pocket, and the like. The sensors are assumed to be biological sensors such as sleep sensor, acceleration sensor, electrocardiographic sensor, body temperature sensor or pulse sensor. However, the present embodiment is not limited to the body area network, but any network may be constructed as long as a hub and nodes can be arranged therein. For example, hub and nodes may be set in any living body other than the human body such as an animal or plant or an object other than a living body such as a plurality of parts of an automobile (e.g., body and wheels or the like).

FIG. 2 illustrates a timing chart of a hub according to Embodiment 1. Operations between a hub and nodes will be described using FIG. 2.

The hub and the nodes perform transmission/reception using a control channel corresponding to a first channel (may also be described as "Cch") and a data channel corresponding to a second channel (may also be described as "Dch"). The hub is supposed to transmit a signal of a beacon frame (beacon signal) using both the control channel and the data channel. The beacon frame is a broadcast frame that broadcasts basic information or control information to nodes within the same network. Basically, two channels having different frequencies are operated by switching therebetween using one RF (radio frequency) unit (which will be described later; see FIG. 18). Note that two RF units: a control channel RF unit and a data channel RF unit can also be used by switching therebetween. The following description assumes that there is one RF unit.

FIG. 2 shows a timing chart of the control channel on an upper side of the drawing and a timing chart of the data channel on a lower side of the drawing. For convenience, the control channel is identified with a channel number N1 and the data channel is identified with a channel number N2. The horizontal axis of the timing chart represents a time axis. A vertically long rectangle assigned a character "B" in the drawing represents a beacon signal which is a broadcast signal. A period assigned "Cch on" indicates that the control channel is operating and a period assigned "Cch off" indicates that the control channel is suspended. Similarly, a period assigned "Dch on" indicates that the data channel is operating and a period assigned "Dch off" indicates that the data channel is suspended.

The hub transmits beacon signals (1011, 1012, 1013, ...) for the control channel using the control channel at predetermined timing, more specifically, at a constant cycle. The beacon signal of the control channel includes information on the data channel used by the hub (channel number, cycle of a beacon signal of the data channel or the like). The beacon signal is generally transmitted through broadcasting, but can also be transmitted through multicasting. During operation of the control channel, except transmission of beacon signals, the hub may also receive beacon signals transmitted by another hub through the control channel to detect information on the data channel used by the other hub if necessary. Note that the present embodiment assumes a case where only one control channel exists and both the hub and the other hub use the same control channel, but there can also be a mode in which a plurality of control channels exist and one of the control channels is used by the hub and the other hub respectively.

The hub transmits a beacon signal (1001, ...) for the data channel using also the data channel at predetermined timing, more specifically, at a constant cycle. The transmission cycle of the beacon signal of the data channel is assumed to be the same as that of the control channel, but the beacon signal transmission cycle is not limited to this. The transmission timing of the beacon signal of the control channel is different from that of the beacon signal of the data channel. When an interval between two beacon signals transmitted through the data channel is assumed to be a beacon interval, the beacon interval includes an allocation-based access period (SP: scheduled period) during which communication is performed through allocation-based access using TDMA (time division multiple access) and a contention-based access period (contention period) during which communication is performed through contention-based access using CSMA or Slotted Aloha or the like. Furthermore, an inactive period during which neither the hub nor the node performs transmission/reception is provided. The order in which these periods are arranged is not limited to the order shown in FIG. 2. Moreover, an arrangement without certain types of period such as a contention-based access period is also possible.

In the TDMA scheme, a period to which the TDMA scheme is applied is divided into a plurality of slots in a time direction and nodes connected to the hub are allocated slots. The nodes can transmit/receive frame signals through allocated slots. As will be described later, the nodes transmit signals through slots allocated to the own device, and additionally, the nodes may be allowed to transmit signals using a shared slot, that is, an unallocated slot which is a slot shared with another node.

Examples of the contention-based access scheme include a slotted aloha scheme and a CSMA based scheme. In the slotted aloha scheme, a period to which the slotted aloha scheme is applied is divided into a plurality of slots and each slot becomes a shared slot of each node. When a node has transmission frames, the node determines transmission or non-transmission of the frames using a defined transmission probability by generating random numbers. When transmission is determined, frames are transmitted. When non-transmission is determined, transmission of frames is put off. The defined transmission probability can be changed as a parameter. Note that during a contention-based access period unlike an allocation-based access period, slots need not be allocated from the hub in advance. In the CSMA base scheme, when a node has transmission frames, carrier sensing is performed between a defined time and a back-off time determined using random numbers, and a transmission right can be acquired if the carrier sensing result is idle and frames can be transmitted.

A beacon signal of the data channel includes a period of the beacon signal and fields for notifying various kinds of information. As will be described later, information that specifies a period during which the data channel is set to OFF can also be included.

As described above, the present embodiment assumes a case where the hub operates through one RF unit by switching between the control channel and the data channel. For this reason, the hub transmits a beacon signal of the control channel during an inactive period of the data channel and changes an operating channel from the data channel to the control channel (A101). The change is performed, for example, when the inactive period starts. After a beacon signal is transmitted through the control channel, the control channel is returned to the data channel again (A102). Thus, during the inactive period, switching between the control channel and the data channel, and transmission of a beacon signal of the control channel are performed, and therefore the length of the inactive period needs to be set to a length by taking them into consideration. To be more specific, the length of the inactive period needs to be equal to or more than a time period required for switching of the setting of the RF unit or the like plus the transmission time period of a beacon signal through the control channel to switch from the data channel to the control channel and from the control channel to the data channel again.

When a node is connected to the hub, the node searches for one or a plurality of control channel candidates and specifies a control channel to be used by the hub. The node receives a beacon signal transmitted by the hub using the specified control channel and detects information on the channel number or the like of the data channel used by the hub. When one control channel to be used is determined in advance, the node may search for only the determined channel.

Then, the node changes the operating channel to a data channel of the detected number and receives a beacon signal transmitted through the data channel from the hub. When connected to the hub, the node performs a process for connection to the hub using a contention-based access period. More specifically, the node transmits a signal of a connection request frame (C-Req) to the hub and receives a signal of a connection acknowledgment frame (C-Ass) from the hub and thereby makes a connection to the hub. At this time, the node can also be allocated slots for the allocation-based access period from the hub.

After being connected to the hub, the node basically sets only the data channel as the operating channel and transmits or receives data such as sensor data using the data channel. When data is not transmitted or received, the node preferably transitions to a sleep state which is a low power consumption state. In the sleep state, a power supply to a circuit not in use such as the RF unit is suspended or reduced or a clock frequency is reduced to thereby seek to reduce power consumption.

While the node is in a sleep state, the hub may change the data channel. For example, when it is assumed that interference occurs in the data channel used by another hub such as an increase of a busy detection rate of the data channel or an increase of an error rate, the data channel is changed by reason of the interference with the other hub. In this case, the hub preferably uses a data channel different from the data channel operated by the neighboring hub as a new data channel. Basically, the hub receives a beacon signal transmitted by the other hub through the control channel and thereby detects the data channel operated by the other hub.

In order to receive the beacon signal transmitted from the other hub through the control channel, the hub preferably searches for control channels for one or more beacon intervals of the control channel. When searching for the control channels, the hub operating on one RF needs to turn OFF the data channel in the meantime. Thus, the hub notifies a period during which the data channel is turned OFF using a beacon signal of the data channel in advance. As shown in the example in FIG. 2, when the hub searches for the control channels, the hub notifies, using the beacon signal 1001 of the data channel, that the data channel is turned OFF for a beacon interval immediately after the beacon signal 1001, one next beacon interval 1002 and a period corresponding to the length of a beacon signal which becomes a trigger to start the beacon interval 1002. The node that has received this notification recognizes that the data channel is turned OFF for the specified beacon interval 1002 and the period corresponding to the length of the beacon signal 1003 which becomes a trigger to start the beacon interval 1002. Note that since the data channel is OFF, the beacon signal 1003 is not transmitted (which means that the beacon signal shown by a broken line in the drawing is not transmitted).

Though the data channel is turned OFF also during the period of the beacon signal 1003 which becomes a trigger to start the beacon interval 1002, as a modification, the beacon signal 1003 may be transmitted and the data channel may be turned OFF only for the beacon interval 1002. That is, the beacon interval may be assumed as a unit period during which the data channel is OFF or a period including the beacon interval plus a period of a beacon signal which becomes a trigger to start the beacon interval may be assumed as a unit period during which the data channel is OFF. In other words, a period after timing at which transmission of a beacon signal ends before timing at which transmission of the next beacon signal starts may be assumed as a unit period or a period after timing at which transmission of a beacon signal starts before timing at which transmission of the next beacon signal starts may be assumed as a unit period.

As the method for notification from the hub, for example, a beacon number (or beacon interval) from which turning OFF of the data channel starts may be set and a data channel OFF bit may be set to ON. Note that when a beacon number specification field for turning OFF the data channel is provided in advance, the data channel OFF bit may be omitted. The beacon number is an identifier of a beacon signal and is updated every time a beacon signal is transmitted. Although the data channel number is set, another method can be to specify from what order of the beacon signal counted from the next beacon signal, the data channel is turned OFF. Here, one beacon number (or beacon interval) is specified, but a plurality of beacon signals may also be allowed to be specified.

Furthermore, a method is also possible whereby only the data channel OFF bit is turned ON using a beacon signal immediately before the beacon interval at which the data channel is turned OFF. In this case, the data channel is turned OFF at a beacon interval immediately after the beacon signal is received. However, when this method is used, the data channel cannot be turned OFF for a period during which the beacon signal is transmitted, of the beacon interval.

As a further notification method, data channel OFF frequency information may be notified when a search is performed using a beacon interval as a unit period or using a period including a beacon interval plus a period corresponding to the length of a beacon signal which becomes a trigger to start the beacon interval as a unit period, if the hub periodically searches for control channels using a beacon signal of the data channel. In this case, since the node that has received the beacon signal knows the frequency with which the hub turns OFF the data channel, the node can transmit/receive data in consideration of the frequency. For example, the OFF frequency information may indicate that for every specified number of unit periods, the data channel is turned OFF for the unit period.

As described above, when the hub changes the data channel while the node is in a sleep state, the node cannot receive the beacon signal of the data channel used before the sleep after being returned from the sleep. In this case, the node temporarily returns the operating channel to the control channel and receives the beacon signal of the control channel over again. In this way, the node detects a number of the data channel currently being operated by the hub, and can thereby transition to a data channel (new data channel) of the detected number.

Thus, only when the node is connected to the hub or when the node misses the data channel operated by the hub, the node may set the control channel as an operating channel, and normally use only the data channel otherwise.

FIG. 3 illustrates a configuration example of the wireless communication device mounted for the hub of the present embodiment. The wireless communication device in FIG. 3 is provided with an antenna 10, a PHY&RF unit 20, a MAC unit 30 according to the present embodiment and an upper layer processor 40. The PHY&RF unit 20 includes a transmitter 21 and a receiver 22, and the MAC unit 30 includes a transmission processor 31, a reception processor 32, an access controller 33 and a channel controller 34. A whole or part of the MAC unit 30 corresponds to an aspect of the baseband integrated circuit or controlling circuitry according to the present embodiment. The PHY&RF unit 20 corresponds to an aspect of an RF integrated circuit or a wireless communicator according to the present embodiment.

The access controller 33 manages accesses of the control channel and the data channel. The data channel is to perform access management for every allocation-based access period, contention-based access period or inactive period, and follows the respective access schemes during the allocation-based access period and the contention-based access period. The access controller 33 performs control on transmissions of beacon signals of the control channel and the data channel at desired timing (constant cycle or the like). More specifically, the access controller 33 instructs the transmission processor 31 to transmit a beacon signal, the transmission processor 31 generates a beacon frame of the control channel or the data channel according to the instruction and outputs the generated beacon frame to the transmitter 21. For example, if the current operating channel is the control channel and corresponds to a period corresponding to the inactive period, the access controller 33 instructs the transmission processor 31 to transmit a beacon signal of the control channel.

The transmitter 21 processes frame transmission using the channel specified by the channel controller 34 as an operating channel. To be more specific, the transmitter 21 processes a desired physical layer on a frame inputted from the transmission processor 31. The transmitter 21 performs D/A conversion or up-conversion to a wireless frequency on the frame subjected to the physical layer processing, generates a transmission signal and outputs a transmission signal into space as a radio wave via the antenna 10.

The access controller 33 outputs a notice of a channel change to the data channel to the channel controller 34 using a transmission end of a beacon signal of the control channel as a trigger. Upon receiving the notice of the channel change, the channel controller 34 outputs a command signal for the channel change to the PHY&RF unit 20. The PHY&RF unit 20 changes the operating channel of the transmitter 21 and the receiver 22 to the data channel. Note that in the present embodiment, the access controller 33 controls the PHY&RF unit 20 via the channel controller 34, but the access controller 33 may directly control the PHY&RF unit 20 without the channel controller 34 and change the operating channel.

After the change to the data channel, the access controller 33 performs control so as to transmit a data channel beacon signal. After that, the access controller 33 controls a beacon interval that follows the transmission of the data channel beacon signal by dividing it into three periods of an allocation-based access period, a contention-based access period and an inactive period. Lengths or the like of the allocation-based access period and the contention-based access period are notified using a data frame beacon signal. The allocation-based access period and the contention-based access period may be determined in advance and only when there is any change, this may be notified using a data frame beacon signal.

The access controller 33 notifies a channel change to the channel controller 34 over again using the start of the inactive period as a trigger, and thereby changes the channel to the control channel. Furthermore, when the hub determines to change the data channel to another data channel based on some conditions, or periodically returns the data channel to the control channel and searches for a beacon interval. In this case, information that specifies a period during which the data channel is turned OFF is inserted in the beacon signal of the data channel transmitted. For example, the aforementioned data channel OFF bit, information on the beacon number from which turning OFF of the data channel starts or data channel OFF frequency information may be notified.

During the contention-based access period, the hub receives a connection request signal or the like from the node. The receiver 22 receives the signal via the antenna 10, performs reception processing on the signal and outputs a frame after the processing to the reception processor 32. Examples of the reception processing may include desired physical layer processing such as frequency conversion to a baseband, A/D conversion, analysis of the physical header of the frame subjected to the A/D conversion, demodulation processing. The reception processor 32 analyzes the processed frame. In the case of a connection request frame, the reception processor 32 analyzes the frame and notifies the analysis result of the connection request frame to the access controller 33. The access controller 33 judges acknowledgment on the connection request of the node and instructs the transmission processor 31 to transmit a connection response frame according to the judgment result. In this case, if the connection request frame includes the sensor type supported by the node or similar information, the access controller 33 notifies the information to the upper layer processor 40 which is a sensor controller and the upper layer processor 40 may judge the quantity (i.e., number) and positions of allocated slots for the node. In this case, the connection request frame includes information on the slots allocated to the node. When the reception processor 32 judges through an analysis of the MAC header or the like that the received frame is a data frame, the reception processor 32 outputs the data frame to the upper layer processor 40.

Note that when there is downlink data to be individually transmitted to the node, the upper layer processor 40 delivers a data frame including the data to the transmission processor 31. The access controller 33 instructs the transmission processor 31 to transmit the data frame to the node through a downlink slot secured during an allocation-based access period using any given method (for example, a method using a beacon signal).

FIG. 4 illustrates a block diagram of a wireless communication device provided for the node according to the present embodiment. The wireless communication device in FIG. 4 is provided with an antenna 110, a PHY&RF unit 120, a MAC unit 130 and an upper layer processor 140. The PHY&RF unit 120 includes a transmitter 121 and a receiver 122, and the MAC unit 130 includes a transmission processor 131, a reception processor 132, an access controller 133 and a channel controller 134. The upper layer processor 140 may also include a function of acquiring sensor information such as a sensing value and a sensing time of a sensor. A whole or part of the MAC unit 130 corresponds to an aspect of a baseband integrated circuit or a controller according to the present embodiment. The PHY&RF unit 120 corresponds to an aspect of an RF integrated circuit or a wireless communicator according to the present embodiment.

The upper layer processor 140 which is a sensor controller sends a transmission request to the access controller 133 to make a connection with the hub at predetermined timing such as activation or when transmission data is generated. The access controller 133 instructs the transmission processor 131 to transmit a connection request frame during a contention-based access period, for example, based on the transmission request from the upper layer processor 140. The transmission processor 131 generates a connection request frame and outputs the connection request frame to the transmitter 121. The transmitter 121 performs desired physical layer processing on the connection request frame. The transmitter 121 performs D/A conversion or up-conversion to a wireless frequency on the frame subjected to the physical layer processing, generates a transmission signal (connection request signal) and outputs the transmission signal into space as a radio wave via the antenna 110. The access controller 133 waits to receive the connection response signal from the hub. The receiver 122 receives a signal via the antenna 110, performs reception processing on the signal and outputs a frame subjected to the processing to the reception processor 132. The reception processing may include desired physical layer processing such as frequency conversion to a baseband, A/D conversion, analysis of the physical header of the frame after A/D conversion, demodulation processing. The reception processor 132 analyzes the processed frame. In the case of a connection response frame, the reception processor 132 analyzes the frame and notifies the analysis result (the quantity and positions of allocated slots or the like) of the connection response frame to the access controller 133. The access controller 133 manages the quantity and positions of slots allocated to the node or the like.

The upper layer processor 140 generates a data frame including transmission data such as sensing information, outputs the data frame to the transmission processor 131 and outputs a data frame transmission request to the access controller 133. Examples of the transmission data include sensing information acquired by a sensor such as a biological sensor, data resulting from processing the sensing information through an application or the like or data including the current state of the node, but the transmission data is not limited to specific data. The upper layer processor 140 may include a data type of the transmission data in the transmission data frame. The data type may be, for example, a type of a sensor mounted on the node or an importance level of sensing information determined from the value of the sensing information. Alternatively, the data type may be a value indicating whether the state of the sensor is abnormal or normal. The data type may be used to judge, for example, whether or not the transmission data frame is an emergency data frame to be preferentially transmitted.

Upon receiving the data frame transmission request, the access controller 133 instructs the transmission processor 131 to transmit a data frame through an allocated slot during an allocation-based access period. In this case, the access controller 133 may determine whether or not the data included in the data frame is data (hereinafter referred to as "emergency data") that needs to be preferentially transmitted among other data in accordance with the type of the data. That is, the access controller 133 may determine whether or not the data frame is an emergency data frame that needs to be preferentially transmitted among other data. For example, when the data type is a type of a sensor, it is possible to define whether the data frame is emergency data or not in accordance with the type of the sensor. Alternatively, a table that associates the type of the sensor with a priority may be provided and the priority may be determined based on the table. In this case, a data frame having a maximum priority or a priority equal to or higher than a predetermined value may be determined as an emergency data frame. Furthermore, when the data type is a value indicating normality or abnormality of the sensor, if the data type indicates an abnormal state, the data frame may be judged as an emergency data frame. In the case of an emergency data frame, the access controller 133 determines that the emergency data frame should be transmitted with a highest priority. In that case, as an example, the access controller 133 determines a slot through which the emergency data frame can be transmitted as quickly as possible from the allocation-based access period or the contention-based access period. When the slot falls within the allocation-based access period, if no carrier is detected through carrier sensing, for example, in an unallocated slot, the access controller 133 performs control so as to transmit the emergency data frame through that slot.

On the other hand, when the slot falls within the contention-based access period, the access controller 133 performs control so as to transmit the data frame according to the contention-based access scheme. According to the slotted aloha scheme, a transmission probability is set to a high value, for example, for emergency data and the emergency data can thereby be preferentially transmitted. The transmission probability may be set to 1 so that the emergency data frame may be transmitted unconditionally through the slot. Alternatively, under a scheme in which carrier sensing is performed from the head of the slot and the data frame is transmitted when the carrier detection result is idle, the carrier sensing time may be set to 0 or shortened for the emergency data. Alternatively, in the case of a CSMA scheme, a contention window or backoff value may be set to be smaller than other data.

When the access controller 33 receives information that specifies a period during which the data channel is turned OFF from the hub through a data channel beacon signal, the access controller 33 performs control so as to turn OFF the data channel for the specified period. Examples of the information include the aforementioned data channel OFF bit, information on a beacon number from which turning OFF of the data channel starts or data channel OFF frequency information. By turning OFF the data channel, the node does not transmit signals through the data channel. It is not necessary to wait to receive signals either. The RF unit may be caused to transition to a sleep state.

Figure 5:
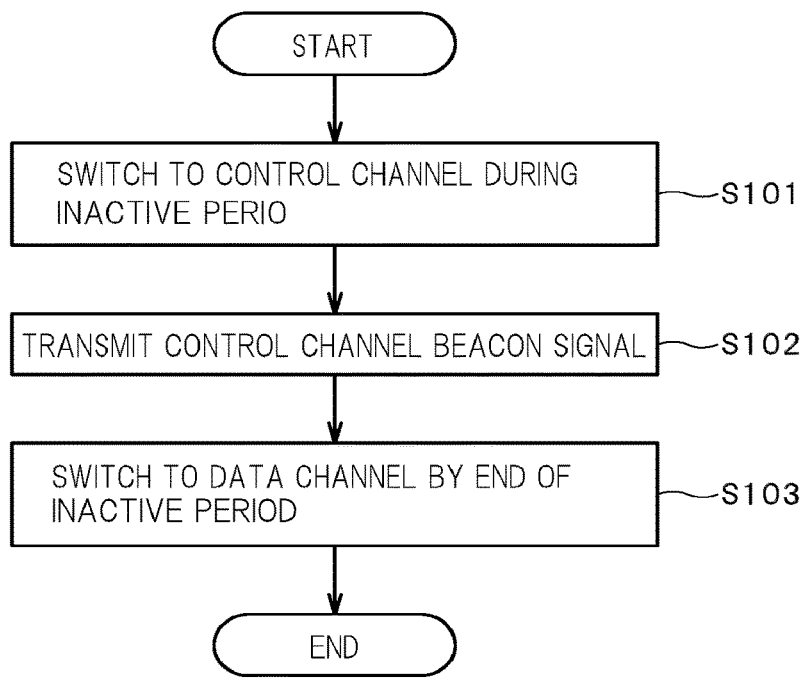
FIG. 5 is a flowchart in a first operation example of the hub.

FIG. 5 is a flowchart of a first operation example of the hub according to Embodiment 1. Operation of the present embodiment is configured such that a beacon signal is transmitted through the control channel at a predetermined cycle and a beacon signal is transmitted through the data channel at a predetermined cycle. In the data channel, an allocation-based access period, a contention-based access period and an inactive period exist within a beacon interval. The hub transmits/receives signals by selectively switching between the control channel and the data channel.

At a head of the inactive period of the data channel, the hub switches the operating channel from the data channel to the control channel (S101). The hub transmits a beacon signal which is a broadcast signal through the control channel during the switched inactive period (S102). The hub switches the operating channel from the control channel to the data channel after transmission of the control channel beacon signal by the end of the inactive period (S103). For example, by performing switching immediately after the transmission of the control channel beacon signal, it is possible to switch the operating channel to the data channel by the end of the inactive period.

FIG. 6 is a flowchart of a second operation example of the hub according to Embodiment 1.

The hub judges the necessity of a search for the control channel based on some conditions such as data channel interference with another hub (S111). The hub transmits a beacon signal including information on specification of a period during which operation of the data channel is turned OFF (a beacon number from which turning OFF of the data channel starts or the like) (S112). The hub performs a channel search for a channel other than the data channel, more specifically, the control channel for the period specified by the beacon signal (S113). Through the channel search, the hub receives a beacon signal transmitted from the other hub through the control channel, analyzes the received beacon signal and identifies a data channel used by the other hub (S114). The hub determines a data channel to be the changed channel from among channels other than the identified data channel (S115).

As described so far, according to Embodiment 1, the hub transitions to the control channel for an inactive period of the data channel, transmits a beacon signal of the control channel and returns to the data channel before the inactive period ends. Therefore, it is possible to efficiently switch between the data channel and the control channel, and reduce power consumption of the hub even using one RF unit without affecting operation of the node.

Since the hub notifies a period during which the data channel is turned OFF (beacon interval or a period including a beacon interval plus a beacon signal transmission period immediately before the beacon interval) using a data channel beacon signal, turns OFF the data channel for the specified period, and can thereby perform a channel search for channels used by the other hub for the specified period.

With such one RF unit, operation using two channels of the control channel and the data channel is possible and power consumption of the hub can be reduced.

Note that the present embodiment assumes that one RF unit is provided, but when a control channel RF unit and a data channel RF unit are provided and one of the RF units is used, it is possible to switch the operating channel such that power consumption of the other RF unit is reduced.

Embodiment 2

A basic mechanism has been described in Embodiment 1 where the hub implements an access scheme with two channels of the control channel and the data channel through one RF unit.

In a body area network, since information on the human body is acquired using sensors and the information is transmitted/received, it is necessary to take into consideration transmission/reception of an emergency signal that notifies emergency. For example, IEEE802.15.6 provides a transmission period dedicated to emergency signals called "EAP (exclusive access phase)" in a beacon interval. On the other hand, emergency signals can be transmitted even for a period under the access scheme described in Embodiment 1 (allocation-based access scheme, contention-based access scheme). For example, during an allocation-based access period, a node connected to the hub can use unused slots to transmit/receive an emergency signal. During a contention-based access period, in the case of a slotted aloha scheme, it is possible to provide a difference in a transmission probability or the like depending on the type of signals or data and preferentially transmit an emergency signal using a shared slot.

On the other hand, as described in Embodiment 1, when the data channel is turned OFF for any one or more beacon intervals in order for the hub to perform a search for the control channels used by the other hub, the node delays transmission of the emergency signal for one or more beacon intervals at worst. A beacon interval is generally assumed to be 50 ms or 100 ms or more, and on the other hand, an emergency signal needs to be transmitted at an interval of 10 ms or less though it depends on the application.

Thus, the present embodiment describes a method for turning OFF the data channel in consideration of the occurrence of an emergency signal.

FIG. 7 illustrates a timing chart of the hub according to the present embodiment. Like FIG. 2, FIG. 7 shows a timing chart of a control channel on an upper side and a timing chart of a data channel on a lower side.

Like Embodiment 1, the hub judges the necessity of a search for the control channel based on some conditions such as data channel interference with other hubs or the like. In this case, the hub transmits OFF notification information (allocation period/inactive period OFF notification information) that notifies that the data channel is turned OFF during an allocation-based access period and an inactive period using a data channel beacon signal 1023 that defines the start of the corresponding beacon interval 1021. Since the inactive period is originally a period during which no communication is performed, OFF notification information (allocation period OFF notification information) that notifies that the data channel is turned OFF during only the allocation-based access period may be transmitted. The node that has received the beacon signal confirms OFF notification information and thereby detects that the data channel is turned OFF for the beacon interval during the allocation-based access period and the inactive period. The hub performs a control channel search for a period other than the contention-based access period, that is, during the allocation-based access period and the inactive period. Note that the hub may temporarily omit transmission of a beacon signal of the control channel for a channel search and continue the search in the meantime.

When a transmission request for an emergency signal occurs within the beacon interval 1021 of the corresponding beacon signal, the node that has received the aforementioned OFF notification information transmits an emergency signal using the contention-based access period during which the data channel is ON. On the other hand, the node that has received a transmission request for a signal other than an emergency signal or a connection request preferably performs transmission from the beacon interval 1022 next to the beacon interval 1021 onward. However, transmission of the transmission request or the connection request may also be allowed during the contention-based access period.

Since a control channel search during a period other than the contention-based access period is completed for the beacon interval 1021, the hub turns OFF the data channel during a period which was the contention-based access period for the preceding beacon interval during the next beacon interval 1022. Furthermore, the hub turns ON the data channel during a period which was the preceding inactive period and specifies information indicating that the period is a contention-based access period (information indicating that the contention-based access scheme is applied). Such specifications are performed using a beacon signal 1024 of the data channel.

Although a specific method for performing such specifications depends on the system or specification or the like, when the data channel beacon format example as shown in FIG. 8 is used, the method is as follows.

As shown in FIG. 8, the data channel beacon signal notifies slot numbers indicating boundaries between the allocation-based access period and the contention-based access period, and between the contention-based access period and the inactive period as "CP Start slot" and "Inactive Start slot" respectively. Thus, when the contention-based access period is altered, these fields are used to perform notification. More specifically, the head timing of the contention-based access period for the corresponding beacon interval 1022 is set as end timing of the contention-based access period for the preceding beacon interval 1021.

Through this operation, for the beacon interval 1022, the end of the allocation-based access period is extended by a length of the contention-based access period for the preceding beacon interval 1021. The length of the contention-based access period within the corresponding beacon interval 1022 becomes the same as the inactive period within the preceding beacon interval 1021 and consequently, the inactive period becomes 0 irrespective of the value of "Inactive Start slot." However, since slots are actually not allocated to any node during a period during which the end of the allocation-based access period is extended, the hub can turn OFF the data channel by regarding this extended period (period shown by a broken line assigned a character IA in the drawing) as a substantially inactive period. Thus, the hub turns OFF the data channel during this period and performs a control channel search. Note that the node need not recognize that the data channel is OFF.

Note that data channel OFF information (Dch Off Info.) exists in the frame format in FIG. 8. In this example, setting the bit of the data channel OFF information to 1 may mean that the data channel for the allocation-based access period is turned OFF. Since the inactive period is originally OFF, the inactive period is not notified. Note that "Lf" represents a frame length.

By so doing, the hub completes a search for the control channel for two beacon intervals, acquires operating data channel information or the like at an adjacent hub from the beacon signal received through the control channel from the adjacent hub and selects a data channel at the destination to which the node moves.

Here, when the start timing of the contention-based access period is shifted, due to the relationship between the original contention-based access period and the inactive period, there is a case with contention-based access period<inactive period, and vice versa. In the case with contention-based access period<inactive period, shifting of the start timing causes no problem because in this way, the contention-based access period extends.

On the other hand, in the opposite case, that is, in the case with contention-based access period>inactive period, the contention-based access period for the next beacon interval becomes shorter. However, during this beacon interval, since the data channel is ON during the allocation-based access period, an emergency signal can be transmitted during the allocation-based access period. Moreover, by adopting the aforementioned slot sharing, an emergency signal can also be transmitted using unallocated slots. Thus, it is possible to reduce influences of shortening the contention-based access period.

Figure 9:
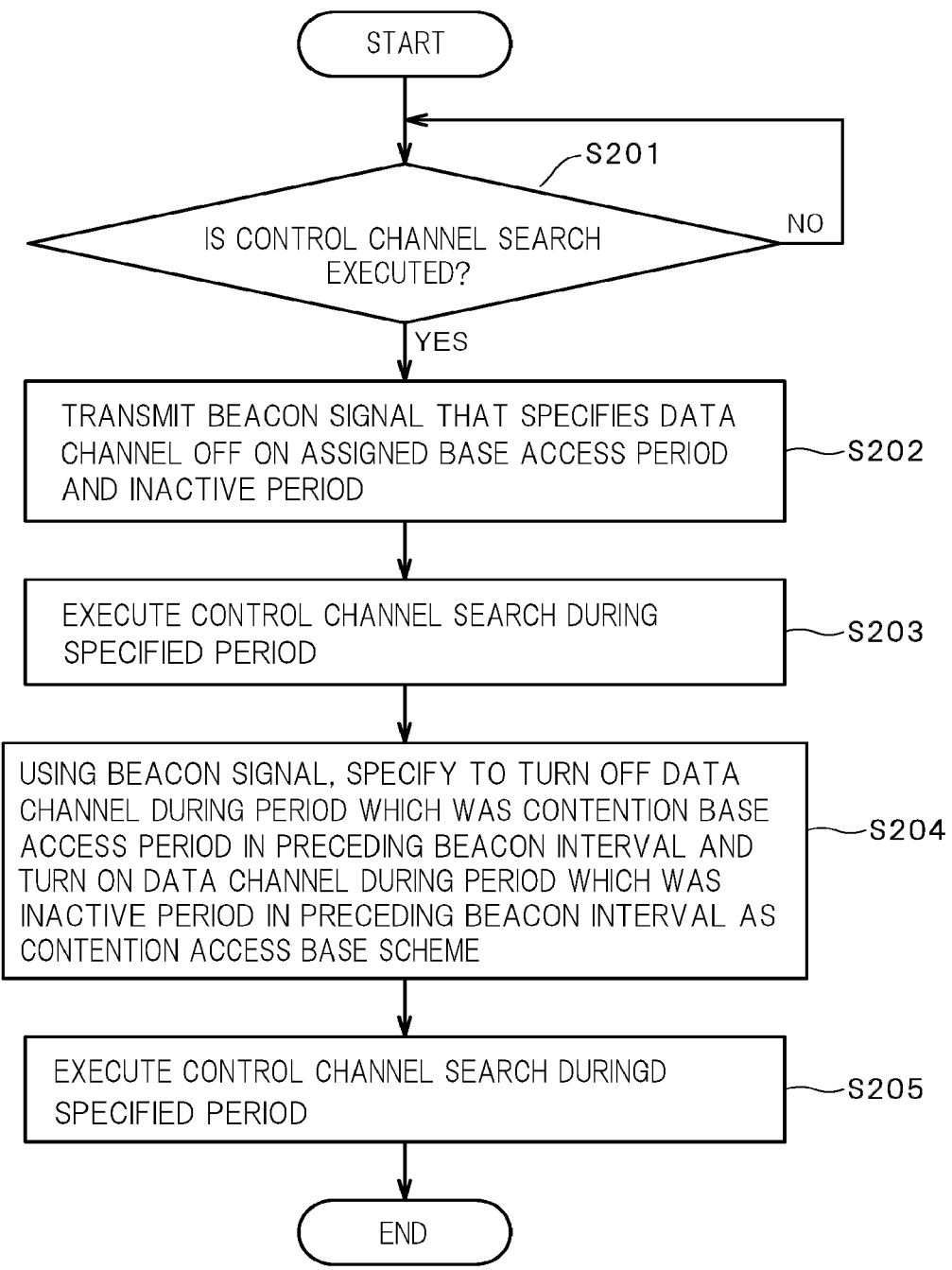
FIG. 9 is a flowchart of an operation example of the hub.

FIG. 9 is a flowchart of an operation example of the hub according to Embodiment 2.

The hub judges the necessity of a search for the control channel under some conditions such as data channel interference with other hubs or the like (S201). The hub transmits OFF notification information that notifies that the data channel is turned OFF during the allocation-based access period and the inactive period (or allocation-based access period) using the data channel beacon signal 1023 that defines a start of the beacon interval 1021 (S202). The hub performs a control channel search during a period other than the contention-based access period, that is, during the allocation-based access period and the inactive period (S203). Since the control channel search during a period other than the contention-based access period is completed for the beacon interval 1021, the hub turns OFF the data channel for the next beacon interval 1022 during a period which was the preceding contention-based access period, turns ON the data channel during the period which was the preceding inactive period and specifies, using a beacon signal 1024, that the period is designated as a contention-based access period (indicating that the contention-based access scheme is applied) (S204). The hub performs a control channel search during the period during which the data channel is turned OFF in step S204 (S205). The subsequent operations are similar to those from step S114 onward of the second operation flow described in Embodiment 1.

In Embodiment 2, the data channel for all the allocation-based access period is turned OFF at a time, but it is also possible to divide the allocation-based access period into a plurality of (e.g., two) periods and turn OFF the data channel for each divided period one by one over a plurality of beacon intervals. Although the time required for the channel search is extended, it is possible to reduce the quantity of nodes that cannot perform transmission through the allocated slot during the allocation-based access period in accordance with the quantity of divisions, and therefore when emergency signals are generated simultaneously at many nodes, it is possible to increase the possibility that at least some of emergency signals may be more reliably transmitted.

Thus, according to Embodiment 2, the data channel is always kept ON at least during the contention-based access period, and it is thereby possible to search for the control channel for a period corresponding to one beacon interval of the control channel as required and detect the operation situations of the other hubs while keeping a mechanism of transmitting emergency signals that suddenly occur at the node with a low delay.

Embodiment 3

In Embodiment 2, the hub searches for the control channels corresponding to one beacon interval using two consecutive beacon intervals. On the other hand, the present embodiment will describe a method of completing a search for one beacon interval after the hub judges the necessity for a channel search.

FIG. 10 illustrates a timing chart of the hub according to the present embodiment. The present embodiment assumes that during normal operation, the hub transmits a beacon signal through the control channel and performs a control channel search during an inactive period.

In the present embodiment, based on the aforementioned assumption, when the hub judges the necessity for a search for the control channel, the hub specifies, using a data channel beacon signal 1034 which defines the start of the corresponding beacon interval 1032, that the data channel is turned OFF for a period corresponding to the allocation-based access period and the contention-based access period for the preceding beacon interval 1031. Furthermore, the hub specifies, using the beacon signal 1034, that the data channel is turned ON for a period which is an inactive period for the preceding beacon interval 1031 and the period is designated as a contention-based access period (indicating that the contention-based access scheme is applied). As a specific method for performing this specification, a technique similar to that described in Embodiment 2 can be used, and therefore detailed description will be omitted.

When an emergency signal transmission request is generated at the node for the beacon interval 1032, the system may wait for the next beacon interval without transmitting any emergency signal within the beacon interval 1032 or perform transmission through slot sharing during the contention-based access period (in the case of a slotted aloha scheme or the like). For example, as described above, in the case of a mechanism whereby transmission is performed by providing differences in the transmission probability or carrier sensing time or the like in accordance with the type or the like of a signal or data, it is possible to expect that transmission will be performed with a high probability when an emergency signal is generated. Thus, taking advantage of this, the node may try to transmit an emergency signal. It is possible to judge whether to wait for the next beacon interval or use slot sharing according to a delay request. More specifically, it may be possible to determine which of the former or the latter is used depending on the type of a signal, priority or a frequency of occurrence.

FIG. 11 is a flowchart of an operation example of the hub according to Embodiment 3.

During normal operation and during an inactive period, the hub performs transmission of a beacon signal through the control channel and a control channel search (S301). The hub judges the necessity for a control channel search under some conditions such as data channel interference with other hubs (S302). When the hub judges the necessity for the control channel search, using the data channel beacon signal 1034 that defines the start of the corresponding beacon interval 1032, the hub specifies that the data channel is turned OFF during a period which corresponds to the allocation-based access period and contention-based access period for the preceding beacon interval 1031, further specifies that the data channel is turned OFF during a period which corresponds to an inactive period for the preceding beacon interval 1031 and specifies that the period is designated as a contention-based access period (S303). The hub performs a control channel search during the period during which the data channel is turned OFF in step S303 (S304). The subsequent operations are similar to those from step S114 onward in the second operation flow described in Embodiment 1.

Note that Embodiments 1 to 3 have been described above on the assumption that the number of control channels is only one and the one control channel is searched for, but there may be a plurality of control channels. In this case, if a plurality of channels need to be searched for, processing similar to the processing described in above Embodiments 1 to 3 may be performed a plurality of times.

Embodiment 4

FIG. 12 shows a block diagram of a hub including a wireless communication device according to Embodiment 4.

In the hub shown in FIG. 12, buffers 71 and 72 are added to the MAC unit 30 of the wireless communication device according to Embodiment 1 shown in FIG. 3. The buffers 71 and 72 are connected to the transmission processor 31 and the reception processor 32. The upper layer processor 40 performs input and output with the transmission processor 31 and the reception processor 32 through the buffers 71 and 72. The buffers 71 and can be, for example, arbitrary volatile memories or non-volatile memories. In this way, the buffers 71 and 72 can be provided to hold the transmission data and the reception data in the buffers 71 and 72. The retransmission process, QoS control according to the frame type etc. or the output process to the upper layer processor 40 can be easily performed.

The configuration of adding the buffers can be similarly applied to the node.

FIG. 13 shows a block diagram of a node including a wireless communication device according to Embodiment 4.

In the node shown in FIG. 13, buffers 171 and 172 are added to the MAC unit 130 of the wireless communication device according to Embodiment 1 shown in FIG. 4. The buffers 171 and 172 are connected to the transmission processor 131 and the reception processor 132, respectively. The upper layer processor 140 performs input and output with the transmission processor 131 and the reception processor 132 through the buffers 171 and 172. The buffers 171 and 172 can be, for example, arbitrary volatile memories or non-volatile memories. In this way, the buffers 171 and 172 can be provided to hold the transmission data and the reception data in the buffers 171 and 172. The retransmission process, QoS control according to the frame type etc., or the output process to the upper layer processor 140 can be easily performed.

Embodiment 5

FIG. 14 shows a block diagram of a hub including a wireless communication device according to Embodiment 5.

The hub illustrated in FIG. 14 has a form that a bus 73 is connected to the buffers 71 and 72 and the access controller 33 in Embodiment 4 illustrated in FIG. 12, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of at least one of the access controller 33 and the channel controller 34 may be achieved by the processor 75.

FIG. 15 shows a block diagram of a node including a wireless communication device according to Embodiment 5.

The node illustrated in FIG. 15 has a form that a bus 173 is connected to the buffers 171 and 172 and the access controller 133 in Embodiment 4 illustrated in FIG. 13, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of at least one of the access controller 133 and the channel controller 134 may be achieved by the processor 175.

Embodiment 6

FIG. 16 shows a block diagram of a hub including a wireless communication device according to Embodiment 6.

The wireless communication device illustrated in FIG. 16 has a form that a clock generator 76 is connected to the MAC unit 30 in the hub relating to Embodiment 1 illustrated in FIG. 3. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit 30, however, it may be provided inside the MAC unit 30.

FIG. 17 shows a block diagram of a node including a wireless communication device according to Embodiment 6.

The wireless communication device illustrated in FIG. 17 has a form that a clock generator 176 is connected to the MAC unit 130 in the node relating to Embodiment 1 illustrated in FIG. 4. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit 130, however, it may be provided inside the MAC unit 130.

Embodiment 7

FIG. 18A shows an example of entire configuration of a hub or a node. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication apparatus according to any one of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, and a hand-held device.

FIG. 18B shows an example of hardware configuration of a wireless LAN module. The configuration can also be applied when the wireless communication apparatus is mounted on either one of the terminal (node or hub). Therefore, the configuration can be applied as an example of specific configuration of the wireless communication apparatus shown in FIGS. 3 and 4. At least one antenna 247 is included in the example of configuration. When a plurality of antennas are included, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212.

The wireless LAN module (wireless communication apparatus) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication or the controller that controls communication.

At least one of the baseband circuit 212 and the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

More detailed processing of each block in the above device is apparent from the explanation of FIGS. 3 and 4 and redundant explanation is omitted.

Embodiment 8

FIG. 19A and FIG. 19B are perspective views of a wireless communication terminal (wireless device) in accordance with Embodiment 8. The wireless device of FIG. 19A is a laptop PC 301 and the wireless device of FIG. 19B is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 20:
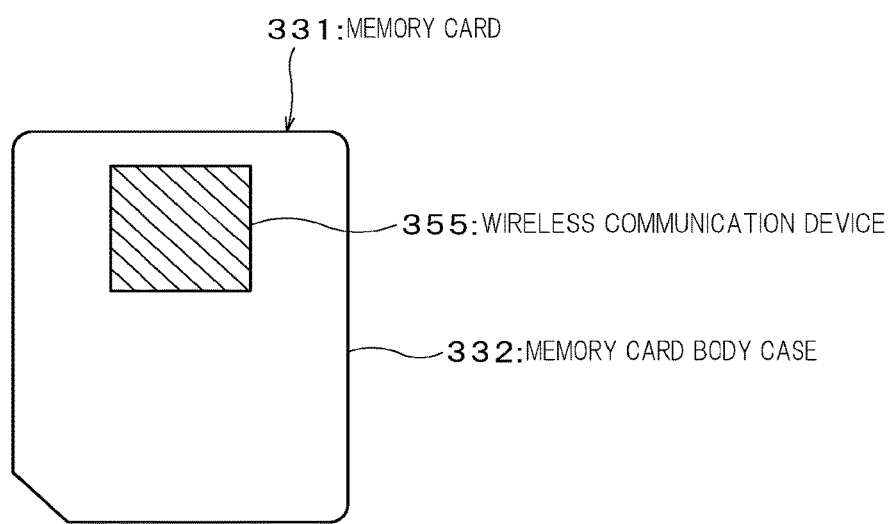
FIG. 20 is a diagram illustrating a memory card according to Embodiment 8.

In addition, the wireless communication device can be incorporated in a memory card. FIG. 20 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 20.

Embodiment 9

Embodiment 9 includes a bus, a processor, and an external interface in addition to the configuration of the wireless communication device in accordance with any one of the above embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware.

Embodiment 10

Embodiment 10 includes a clock generator in addition to the configuration of the wireless communication device in accordance with any one of the above embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Embodiment 11

Embodiment 11 includes a power source, a power source controller, and a wireless power supply in addition to the configuration of the wireless communication device in accordance with any one of the above embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Embodiment 12

Embodiment 12 includes a SIM card in addition to the configuration of the wireless communication device in accordance with the above embodiment. The SIM card is connected to any block element in the wireless communication device; an access controller or a baseband IC, etc. In this manner, by providing a configuration where the SIM card is provided in the wireless communication device, it is made possible to readily perform the authentication processing.

Embodiment 13

Embodiment 13 includes a video compression/extension unit in addition to the configuration of the wireless communication device in accordance with the above embodiment. The video compression/extension unit is connected to a bus. In this manner, by configuring the video compression/extension unit included in the wireless communication device, it is made possible to readily perform transfer of the compressed video and the extension of the received compressed video.

Embodiment 14

Embodiment 14 includes an LED unit in addition to the configuration of the wireless communication device in accordance with any one of the above embodiments. The LED unit is connected to any block element in the wireless communication device; an access controller or a baseband IC, etc. In this manner, by providing a configuration where the LED unit is provided in the wireless communication device, it is made possible to readily notify the operating state of the wireless communication device to the user.

Embodiment 15

Embodiment 15 includes a vibrator unit in addition to the configuration of the wireless communication device in accordance with any one of the above embodiments. The vibrator unit is connected to any block element in the wireless communication device; an access controller or a baseband IC, etc. In this manner, by providing a configuration in which the vibrator unit is provided in the wireless communication device, it is made possible to readily notify the operating state of the wireless communication device to the user.

Embodiment 16

In Embodiment 16, the configuration of the wireless communication device includes a display in addition to the configuration of the wireless communication device according to any one of the above embodiments. The display may be connected to any block element in the wireless communication device via a bus (not shown); an access controller or a baseband IC, etc. As seen from the above, the configuration including the display to display the operation state of the wireless communication device on the display allows the operation status of the wireless communication device to be easily notified to a user.

Embodiment 17

Figure 21:
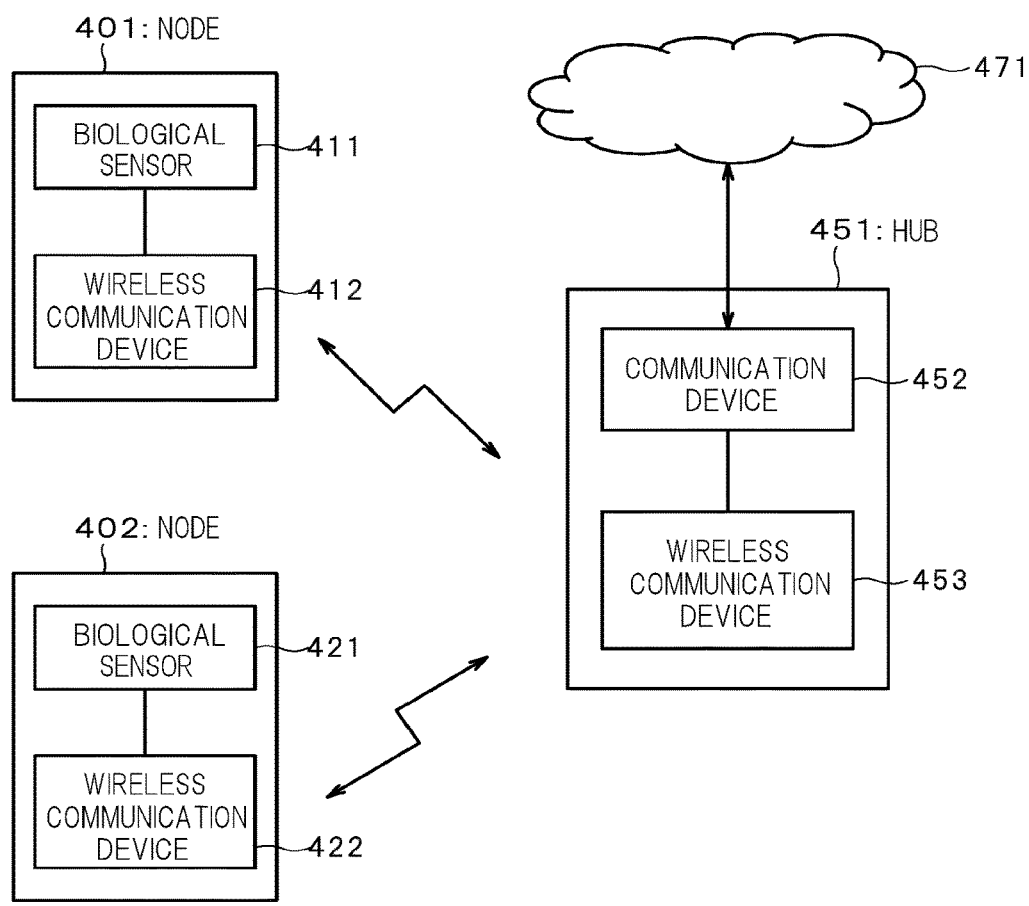
FIG. 21 is a diagram illustrating a wireless communication system according to Embodiment 17.

FIG. 21 illustrates an overall configuration of a wireless communication system in accordance with Embodiment 17. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological sensor 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may be provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

FIG. 22 is a block diagram illustrating a hardware configuration of the node 401 or node 402 illustrated in FIG. 21. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 21, and the biological sensor 515 corresponds to the biological sensor 411, 421 of FIG. 21. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

FIG. 23 is a block diagram that illustrates a hardware configuration of the hub 451 illustrated in FIG. 21. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 21, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The term "circuitry" may refer to not only electric circuits or a system of circuits used in a device but also a single electric circuit or a part of the single electric circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless communication device comprising:
controlling circuitry configured to switch an operating channel between a first channel and a second channel; and
a transmitter configured to transmit a first beacon signal through the first channel at first cycles when the operating channel is the first channel and transmit a second beacon signal through the second channel at second cycles when the operating channel is the second channel,
wherein the transmitter is configured to transmit and receive a signal within a first period included in the second cycles through the first channel and not transmit and receive a signal within a second period included in the second cycles through the second channel, the second cycles each including the first period and the second period, and
wherein the controlling circuitry is configured to change an order of the first period and the second period in one of the second cycles so that the first period is positioned after the second period in the one of the at least two of the second cycles, and the first period is positioned before the second period in another one of the at least two of the second cycles.

2. The wireless communication device according to claim 1, wherein the second period has a length equal to or greater than a total length of: a time required to switch the second channel to the first channel, a time required for the first channel to transmit the first beacon signal and a time required to switch the first channel to the second channel.

3. The wireless communication device according to claim 1, wherein the transmitter is configured to transmit the second beacon signal including information that specifies positions of the first period and the second period included in at least one of the second cycles.

4. The wireless communication device according to claim 1,
wherein the first period included in a first one of the second cycles and the first period included in a second one of the second cycles after the first one of the second cycles each comprises a third period and a fourth period,
the transmitter is configured to transmit the second beacon signal including information to specify that operation of the second channel is turned OFF for the third period in the first period included in the first one of the second cycles,
the controlling circuitry is configured to perform a channel search during the third period included in the first one of the second cycles,
the transmitter is configured to transmit the second beacon signal including information to specify that operation of the second channel is turned OFF for the fourth period in the first period included in the second one of the second cycles, and
the controlling circuitry is configured to perform the channel search for the fourth period included in the second one of the second cycles.

5. The wireless communication device according to claim 1, wherein the controlling circuitry is configured to perform communication for the first period under an allocation-based access scheme whereby communication with another wireless communication device is performed using a slot allocated in advance.

6. The wireless communication device according to claim 1,
wherein the first period comprises a fifth period during which communication with another wireless communication device is performed under an allocation-based access scheme communicating and a sixth period during which communication with the other wireless communication device is performed under a contention-based access scheme,
the transmitter is configured to transmit the second beacon signal including information to specify that operation of the second channel is turned OFF for the fifth period in the first period included in a first one of the second cycles,
the controlling circuitry is configured to perform a channel search during the fifth period in the first period included in the first one of the second cycles,
the allocation-based access scheme is applied during the first period included a second one of the second cycles after the first one of the second cycles,
the transmitter is configured to transmit the second beacon signal including information to specify that the contention-based access scheme is applied during the second period included in the second one of the second cycles, and
the controlling circuitry is configured to perform the channel search during the sixth period in the first period included in the second one of the second cycles.

7. The wireless communication device according to claim 1,
wherein the controlling circuitry is configured to perform a channel search during the second period included in a first one of the second cycles, the controlling circuitry is configured to turn OFF the second channel during the first period included in a second one of the second cycles after the first one of the second cycles, the transmitter is configured to transmit the second beacon signal including information to specify that communication is performed under a contention-based access scheme during the second period included in the second one of the second cycles, and the controlling circuitry is configured to perform the channel search during the first period included in the second one of the second cycles.

8. The wireless communication device according to claim 1, wherein the controlling circuitry is configured to identify, through a channel search within each second period, a channel used by another wireless communication device for transmission of the first beacon signal, analyze a first beacon signal received through the identified channel and identify a second channel used by another wireless communication device for transmission of the second beacon signal.

9. The wireless communication device according to claim 1, wherein the first channel is a control channel and the second channel is a data channel.

10. The wireless communication device according to claim 1, further comprising at least one antenna.

11. The wireless communication device according to claim 1, wherein the first channel is a control channel for communication of control information and the second channel is a data channel for data communication, and during the second period included in at least one of the second cycles, the controlling circuitry is configured to switch the operating channel from the second channel to the first channel, the transmitter is configured to transmit the first beacon signal through the first channel, and the controlling circuitry is configured to switch the operating channel from the first channel to the second channel.

12. A wireless communication method comprising:

selectively switching an operating channel between a first channel and a second channel; and transmitting a first beacon signal through the first channel at first cycles when the operating channel is the first channel and transmitting a second beacon signal through the second channel at second cycles when the operating channel is the second channel, wherein transmission and reception of a signal is possible within a first period included in the second cycles and transmission and reception of a signal is not performed within a second period included in the second cycles, the second cycles each including the first period and the second period; and changing an order of the first period and the second period in one of the second cycles so that the first period is positioned after the second period in the one of the at least two of the second cycles, and the first period is positioned before the second period in another one of the at least two of the second cycles.

13. The wireless communication method according to claim 12, wherein the second period has a length equal to or greater than a total length of: a time required to switch the second channel to the first channel, a time required for the first channel to transmit the first beacon signal and a time required to switch the first channel to the second channel.

14. The wireless communication method according to claim 12, comprising:

transmitting the second beacon signal including information to specify the positions of the first period and the second period included in the second cycle.

15. The wireless communication method according to claim 14, wherein the first period included in a first one of the second cycles and the first period included in a second one of the second cycles after the first one of the second cycles each comprises a third period and a fourth period, and wherein the method further comprises:

transmitting the second beacon signal including information to specify that operation of the second channel is turned OFF for the third period in the first period in a first one of the second cycles;

performing a channel search during the third period included in the first one of the second cycles;

transmitting the second beacon signal including information to specify that operation of the second channel is turned OFF for the fourth period in the first period included in the second one of the second cycles; and performing the channel search for the fourth period included in the second one of the second cycles.

16. The wireless communication method according to claim 12, wherein the first channel is a control channel for communication of control information and the second channel is a data channel for data communication, and wherein the method further comprises:

during the second period included in at least one of the second cycles, switching the operating channel from the second channel to the first channel, transmitting the first beacon signal through the first channel, and switching the operating channel from the first channel to the second channel.

* * * * *